US012605231B2

(12) United States Patent
Kim

(10) Patent No.: US 12,605,231 B2
(45) Date of Patent: Apr. 21, 2026

(54) METHOD AND DEVICE FOR PROCESSING THREE-DIMENSIONAL ORAL CAVITY MODEL AND COMPUTER-READABLE RECORDING MEDIUM

(71) Applicant: MEDIT CORP., Seoul (KR)

(72) Inventor: Du Su Kim, Seoul (KR)

(73) Assignee: MEDIT CORP., Seoul (KR)

( * ) Notice: Subject to any disclaimer, the term of this patent is extended or adjusted under 35 U.S.C. 154(b) by 330 days.

(21) Appl. No.: 18/034,210

(22) PCT Filed: Oct. 27, 2021

(86) PCT No.: PCT/KR2021/015207
§ 371 (c)(1),
(2) Date: Apr. 27, 2023

(87) PCT Pub. No.: WO2022/092802
PCT Pub. Date: May 5, 2022

(65) Prior Publication Data
US 2023/0397972 A1 Dec. 14, 2023

(30) Foreign Application Priority Data

Oct. 28, 2020 (KR) ........................ 10-2020-0141572
Dec. 8, 2020 (KR) ........................ 10-2020-0170755

(51) Int. Cl.
*A61C 7/00* (2006.01)
*A61C 9/00* (2006.01)

(52) U.S. Cl.
CPC ............ *A61C 7/002* (2013.01); *A61C 9/0053* (2013.01)

(58) Field of Classification Search
CPC .. A61C 7/002; A61C 7/00; A61C 7/02; A61C 13/0004; A61C 19/05;
(Continued)

(56) References Cited

U.S. PATENT DOCUMENTS 10,751,149 B1 8/2020 Raslambekov
12,154,243 B2 * 11/2024 Cofar ...................... G06T 17/00
(Continued)

FOREIGN PATENT DOCUMENTS

CN 105551081 A 5/2016
CN 109431632 A 3/2019
(Continued)

OTHER PUBLICATIONS

Extended European Search Report dated Aug. 26, 2024 in Application No. 21886796.8.
(Continued)

*Primary Examiner* — Vijay Shankar
(74) *Attorney, Agent, or Firm* — Sughrue Mion, PLLC

(57) ABSTRACT

According to embodiments, a method and apparatus for processing a three-dimensional (3D) intraoral model are provided. The method of processing a 3D intraoral model may include obtaining a tooth model and a gingival model from the 3D intraoral model, deforming the gingival model by reflecting an amount of movement of gingiva according to a displacement indicating movement of one or more teeth included in the tooth model, obtaining a final gingival model by suppressing, using one or more control factors, at least a part of the displacement indicating movement of the teeth from being reflected in the amount of movement of the gingiva, and displaying, on a display, the obtained final gingival model and a final tooth model representing movement of the one or more teeth included in the tooth model.

17 Claims, 27 Drawing Sheets

(58) Field of Classification Search
    CPC ............ A61C 2007/004; A61C 9/0053; A61C
                      9/0033; A61C 11/006; G16H 20/30
    See application file for complete search history.

(56)                   References Cited

U.S. PATENT DOCUMENTS

| | | | |
|---|---|---|---|
| 12,154,244 | B2 * | 11/2024 | Cofar ................... A61B 5/0035 |
| 2017/0340414 | A1 | 11/2017 | Janzadeh et al. |
| 2018/0206939 | A1 | 7/2018 | Kim et al. |
| 2023/0154624 | A1 * | 5/2023 | Nikolskiy ................. G06T 7/11 705/2 |
| 2023/0309800 | A1 * | 10/2023 | Farkash ................. G16H 50/20 |
| 2024/0197447 | A1 * | 6/2024 | Lee ........................... G06T 5/70 |
| 2025/0054259 | A1 * | 2/2025 | Cofar ................... A61B 5/4547 |

FOREIGN PATENT DOCUMENTS

| | | |
|---|---|---|
| CN | 110279476 A | 9/2019 |
| JP | 2002-526153 A | 8/2002 |
| KR | 10-2019-0032291 A | 3/2019 |
| KR | 10-2019-0033523 A | 3/2019 |
| WO | 00/19928 A1 | 4/2000 |
| WO | 2017/205484 A1 | 11/2017 |
| WO | 2017/223062 A1 | 12/2017 |
| WO | 2018/030576 A1 | 2/2018 |

OTHER PUBLICATIONS

Yuan, Tianran et al., "Tooth segmentation and gingival tissue deformation framework for 3D orthodontic treatment planning and evaluating", Medical & Biological Engineering & Computing, Jul. 22, 2020, pp. 2271-2290, vol. 58.
Korean Notice of Allowance for Application No. 10-2020-0170755 dated Apr. 3, 2023.
Chinese Office Action dated Jul. 21, 2025, issued in Chinese application No. 202180073423.4.

* cited by examiner

FIG. 1
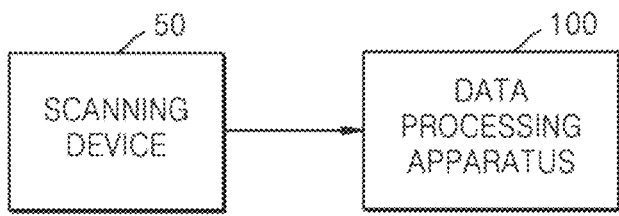
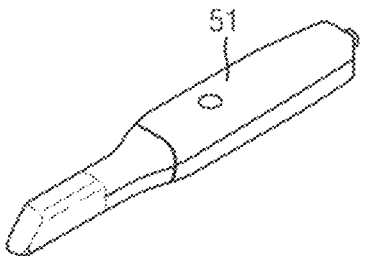

200
INITIAL INTRAORAL MODEL

300
TARGET INTRAORAL MODEL

INITIAL TOOTH MODEL 210

TARGET TOOTH MODEL 310

INITIAL GINGIVAL MODEL 220

TARGET GINGIVAL MODEL 320

ONE OR MORE CONTROL FACTORS 250

FIG. 4

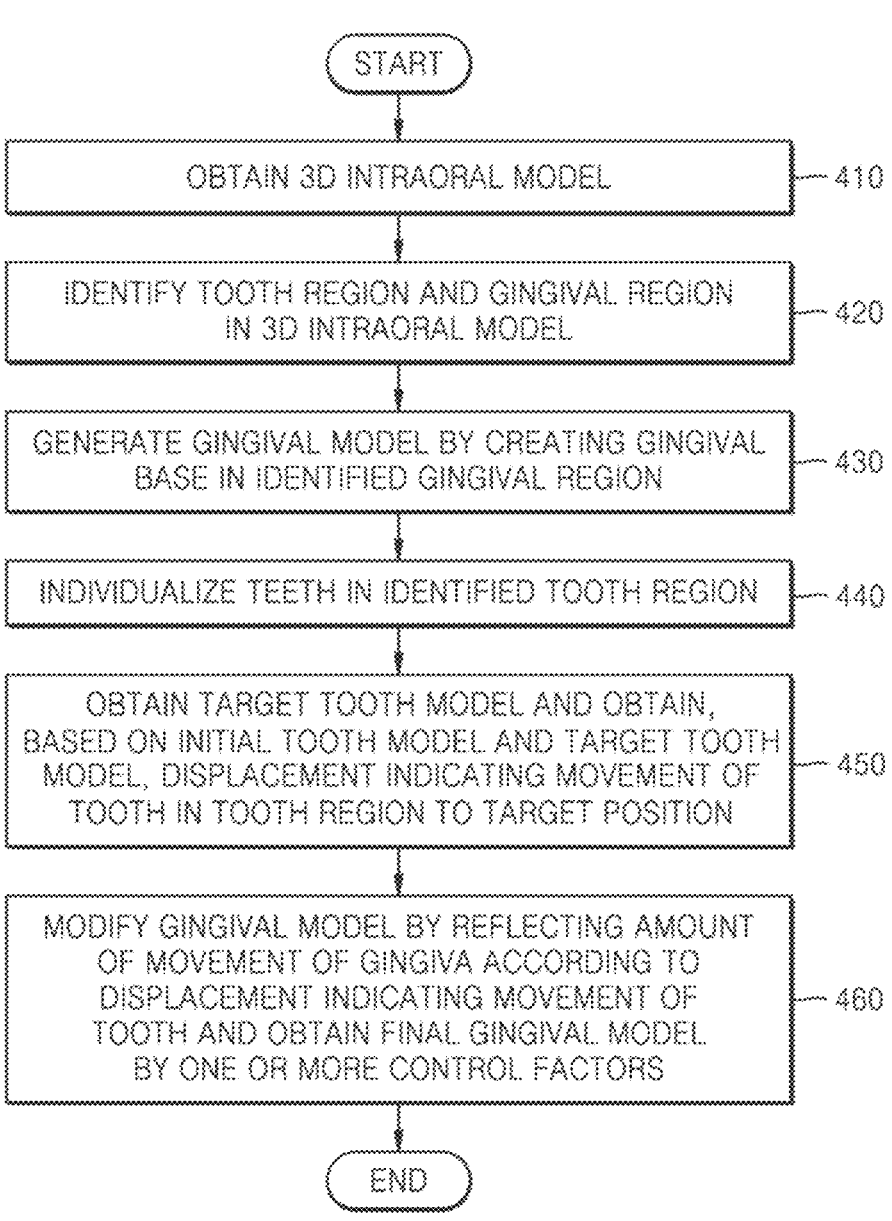

START

OBTAIN 3D INTRAORAL MODEL — 410

IDENTIFY TOOTH REGION AND GINGIVAL REGION
IN 3D INTRAORAL MODEL — 420

GENERATE GINGIVAL MODEL BY CREATING GINGIVAL
BASE IN IDENTIFIED GINGIVAL REGION — 430

INDIVIDUALIZE TEETH IN IDENTIFIED TOOTH REGION — 440

OBTAIN TARGET TOOTH MODEL AND OBTAIN,
BASED ON INITIAL TOOTH MODEL AND TARGET TOOTH
MODEL, DISPLACEMENT INDICATING MOVEMENT OF
TOOTH IN TOOTH REGION TO TARGET POSITION — 450

MODIFY GINGIVAL MODEL BY REFLECTING AMOUNT
OF MOVEMENT OF GINGIVA ACCORDING TO
DISPLACEMENT INDICATING MOVEMENT OF
TOOTH AND OBTAIN FINAL GINGIVAL MODEL
BY ONE OR MORE CONTROL FACTORS — 460

END

PORTION HAVING
VALUE OF CURVATURE
DISTRIBUTION LESS
THAN THRESHOLD

FIG. 10

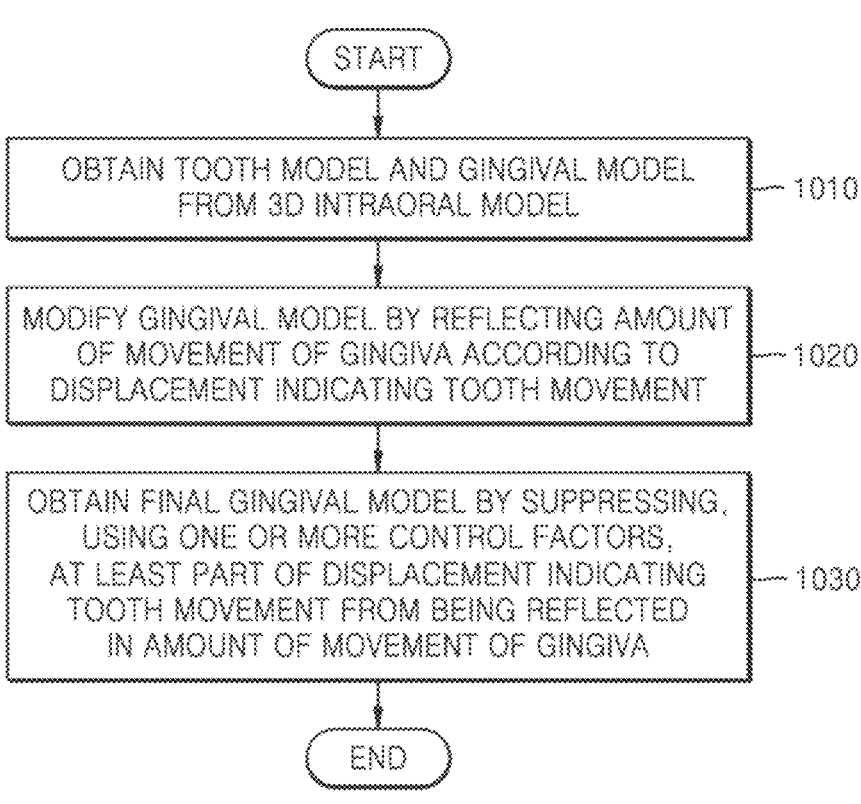

START

OBTAIN TOOTH MODEL AND GINGIVAL MODEL
FROM 3D INTRAORAL MODEL — 1010

MODIFY GINGIVAL MODEL BY REFLECTING AMOUNT
OF MOVEMENT OF GINGIVA ACCORDING TO
DISPLACEMENT INDICATING TOOTH MOVEMENT — 1020

OBTAIN FINAL GINGIVAL MODEL BY SUPPRESSING,
USING ONE OR MORE CONTROL FACTORS,
AT LEAST PART OF DISPLACEMENT INDICATING
TOOTH MOVEMENT FROM BEING REFLECTED
IN AMOUNT OF MOVEMENT OF GINGIVA — 1030

END

INITIAL COORDINATES X
(SCAN COORDINATES)

DISPLACEMENT D

TARGET COORDINATES T

INITIAL POSITION = {X1, X2, X3, X4, X5, . . . Xn}
TARGET POSITION = {T1, T2, T3, T4, T5, . . . Tn}
DISPLACEMENT = {D1, D2, D3, D4, D5, . . . Dn}

START

PLACE PLURALITY OF CONTROL POINTS
IN SPACE OF 3D INTRAORAL MODEL — 1210

DETERMINE AMOUNT OF MOVEMENT OF PLURALITY
OF CONTROL POINTS ACCORDING TO ONE OR MORE — 1220
DISPLACEMENTS INDICATING MOVEMENT OF TOOTH

DEFORM GINGIVAL MODEL BY REFLECTING
AMOUNT OF MOVEMENT OF GINGIVA DETERMINED
ACCORDING TO AMOUNT OF MOVEMENT OF — 1230
PLURALITY OF CONTROL POINTS

END

FIG. 21

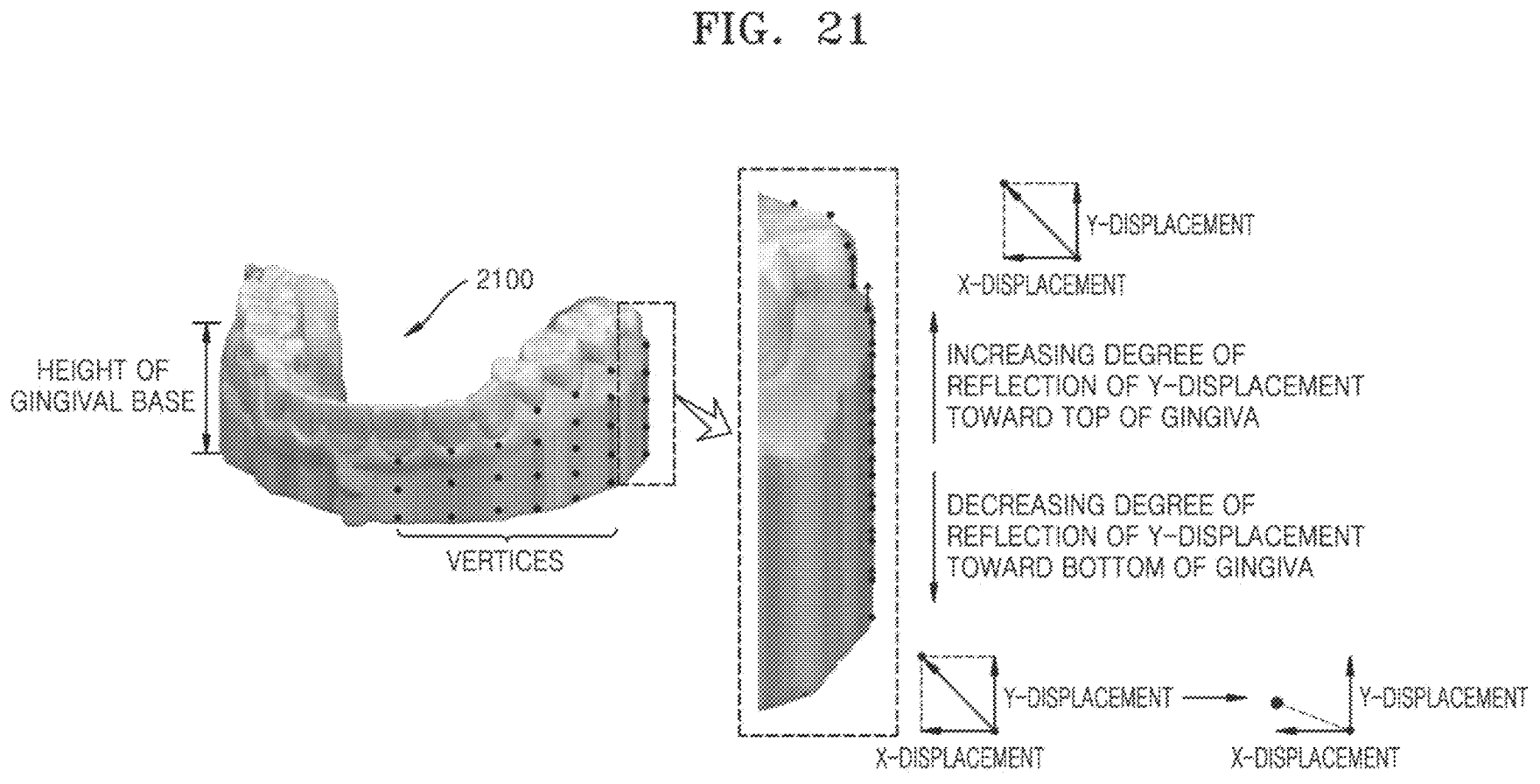

Y-DISPLACEMENT

X-DISPLACEMENT

INCREASING DEGREE OF REFLECTION OF Y-DISPLACEMENT TOWARD TOP OF GINGIVA

DECREASING DEGREE OF REFLECTION OF Y-DISPLACEMENT TOWARD BOTTOM OF GINGIVA

Y-DISPLACEMENT

X-DISPLACEMENT

Y-DISPLACEMENT

Y-DISPLACEMENT

X-DISPLACEMENT

2100

VERTICES

HEIGHT OF GINGIVAL BASE

FIG. 22
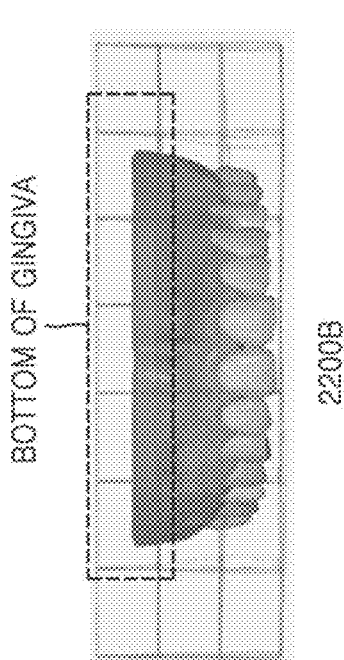
2200B
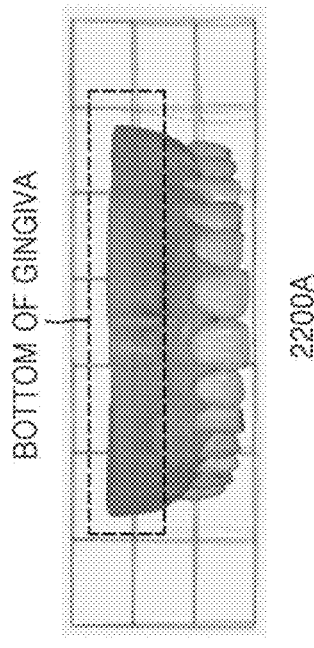
2200A

TOOTH SHAPE BEFORE MOVEMENT xmov

TOOTH SHAPE AFTER MOVEMENT xmov

FIG. 25

METHOD AND DEVICE FOR PROCESSING THREE-DIMENSIONAL ORAL CAVITY MODEL AND COMPUTER-READABLE RECORDING MEDIUM

This Application is a National Stage of International Application No. PCT/KR2021/015207 filed Oct. 27, 2021, claiming priority based on Korean Patent Application No. 10-2020-0141572 filed Oct. 28, 2020 and Korean Patent Application No. 10-2020-0170755 filed Dec. 8, 2020.

TECHNICAL FIELD

Embodiments of the disclosure relate to a method and apparatus for processing a three-dimensional (3D) intraoral model. In particular, the embodiments of the disclosure relate to a 3D intraoral model processing method and apparatus for naturally modeling deformation of gingiva due to movement of a tooth in an intraoral cavity.

BACKGROUND ART

There are various fields in dental treatment of a patient. Orthodontics is a field of dental treatment. Several methods are used for orthodontic treatment. For example, to perform orthodontic treatment, orthodontic appliances such as brackets are placed on a patient's teeth, and at least one bracket attached thereto is connected to a wire. The brackets connected to the wire may be used to correct the position of teeth by moving at least one tooth to a desired position, i.e., to a final position or a target position of the tooth. In orthodontic treatment planning, as teeth of the patient are moved from their initial positions to target positions, the shape of gingiva is also changed, and it is necessary to show the shape of the gingiva changing naturally as the teeth move. When showing patients the amount of tooth movement on the display, the gingiva is also shown because showing only the teeth looks unnatural, and at this time, deformation of the gingiva needs to be displayed naturally.

DISCLOSURE

Technical Problem

Embodiments of the disclosure relate to a method and apparatus for processing a three-dimensional (3D) intraoral model for naturally modeling deformation of gingiva according to movement of teeth in an intraoral cavity.

Technical Solution

A method of processing a 3D intraoral model according to an embodiment includes obtaining a tooth model and a gingival model from the 3D intraoral model, deforming the gingival model by reflecting an amount of movement of gingiva according to a displacement indicating movement of one or more teeth included in the tooth model, obtaining a final gingival model by suppressing, using one or more control factors, at least a part of the displacement indicating movement of the teeth from being reflected in the amount of movement of the gingiva, and displaying, on a display, the obtained final gingival model and a final tooth model representing movement of the one or more teeth included in the tooth model.

According to an embodiment, an amount of a horizontal translation of the gingiva included in the final gingival model may be less than or equal to a value of a displacement indicating a horizontal translation of the one or more teeth.

According to an embodiment, an amount of rotation of the gingiva included in the final gingival model may be less than or equal to a value of a displacement indicating rotation of the one or more teeth.

According to an embodiment, the deforming of the gingival model may include placing a plurality of control points in a space of the 3D intraoral model, determining an amount of movement of the plurality of control points according to the displacement indicating movement of the one or more teeth, and deforming the gingival model by reflecting the amount of movement of the gingiva, which is determined according to the amount of movement of the plurality of control points.

According to an embodiment, the placing of the plurality of control points in the space of the 3D intraoral model may include placing the plurality of control points at different densities according to the displacement indicating movement of the teeth.

According to an embodiment, the placing of the plurality of control points in the space of the 3D intraoral model may include placing one or more control points on at least a part of a plane of a 3D figure surrounding the 3D intraoral model.

According to an embodiment, the placing of the plurality of control points in the space of the 3D intraoral model may include serially placing one or more control points on an axis of rotation of the teeth.

According to an embodiment, the obtaining of the final gingival model by using the control factors may include suppressing distortion in a space surrounding the 3D intraoral model by placing one or more stabilizers in the space surrounding the 3D intraoral model.

According to an embodiment, the stabilizers may represent a zero displacement constraint.

According to an embodiment, the obtaining of the final gingival model by using the control factors may include suppressing distortion of a bottom of the gingiva by performing base-fixing on at least a portion of the amount of movement of the gingiva.

According to an embodiment, the base-fixing may be performed by controlling displacement on an axis indicating an occlusal direction in an amount of movement of the bottom of the gingiva.

According to an embodiment, the obtaining of the final gingival model by using the control factors may include reducing a rotation transformation component having an occlusal direction as an axis in the displacement indicating movement of the teeth.

According to an embodiment, the obtaining of the tooth model and the gingival model from the 3D intraoral model may include identifying a gingival region in the 3D intraoral model and obtaining the gingival model by creating a virtual gingival base at an edge of the identified gingival region.

According to an embodiment, an approximation technique may be used to obtain the final gingival model.

An apparatus for processing a 3D intraoral model according to an embodiment includes a memory storing one or more instructions and a processor configured to execute the one or more instructions stored in the memory to obtain a tooth model and a gingival model from the 3D intraoral model, deform the gingival model by reflecting an amount of movement of gingiva according to a displacement indicating movement of one or more teeth included in the tooth model, obtain a final gingival model by suppressing, using one or more control factors, at least a part of the displacement indicating movement of the teeth from being reflected in the amount of movement of the gingiva, and display, on a display, the obtained final gingival model and a final tooth model representing movement of the one or more teeth included in the tooth model.

In a computer-readable recording medium having recorded thereon a program including at least one instruction for performing a method of processing a 3D intraoral model by a computer, according to an embodiment, the method includes obtaining a tooth model and a gingival model from the 3D intraoral model, deforming the gingival model by reflecting an amount of movement of gingiva according to a displacement indicating movement of one or more teeth included in the tooth model, obtaining a final gingival model by suppressing, using one or more control factors, at least a part of the displacement indicating movement of the teeth from being reflected in the amount of movement of the gingiva, and displaying, on a display, the obtained final gingival model and a final tooth model representing movement of the one or more teeth included in the tooth model.

Advantageous Effects

In a method and apparatus for processing a 3D intraoral model according to embodiments of the disclosure, more natural gingival deformation may be obtained by controlling gingival deformation by taking into account one or more control factors, rather than representing the gingival deformation simply based on movement of teeth.

In the method and apparatus for processing a 3D intraoral model according to the embodiments of the disclosure, an intraoral image showing natural deformation of gingiva according to movement of teeth in an intraoral cavity may be displayed on a display, so that a patient's dental status predicted after orthodontic treatment may be shown to the patient naturally and without any awkwardness.

DESCRIPTION OF DRAWINGS

The present disclosure will be easily understood from the following description taken in conjunction with the accompanying drawings in which reference numerals denote structural elements.

FIG. 1 is a diagram for describing a digital intraoral model processing system according to an embodiment of the disclosure.

FIG. 4 is a flowchart of a method, performed by a data processing apparatus, of processing a three-dimensional (3D) intraoral model, according to an embodiment of the disclosure.

FIG. 10 is a flowchart of a method of deforming a gingival model, according to an embodiment.

FIG. 21 is a reference diagram for describing base fixing according to an embodiment.

FIG. 22 is a reference diagram illustrating a difference between an example in which base fixing according to an embodiment of the disclosure is applied and an example in which base fixing is not applied.

FIG. 25 is a reference diagram for describing a method for naturally showing facial deformation according to movement of teeth, according to an embodiment.

MODE FOR INVENTION

Figure 2:
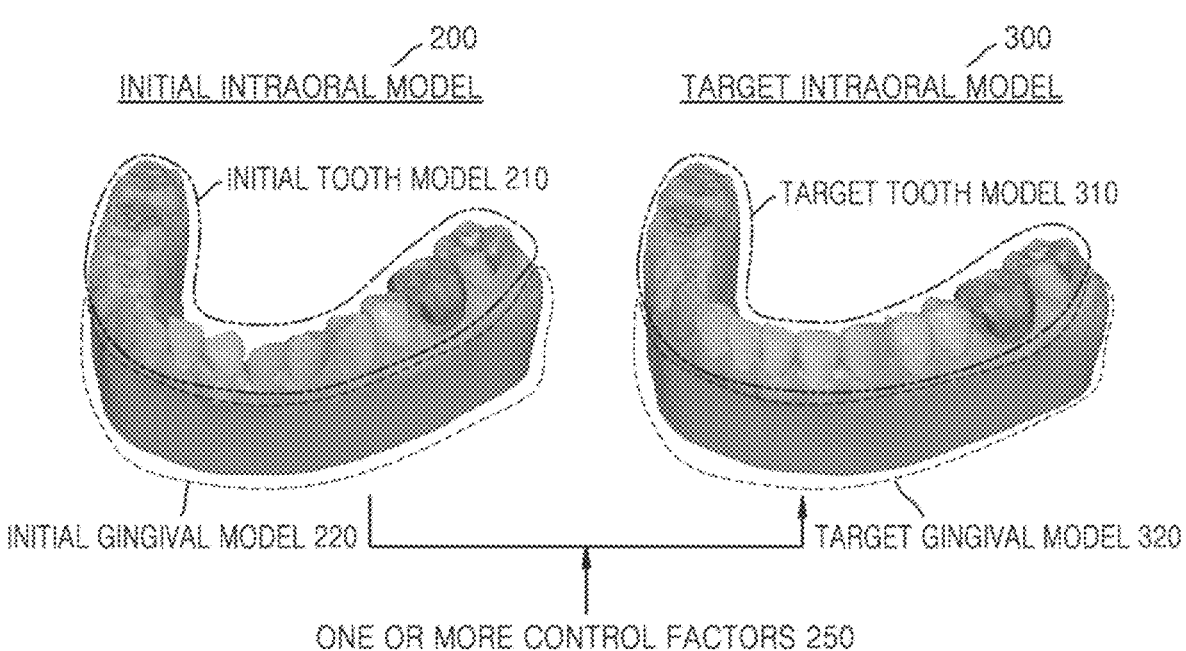
FIG. 2 is a reference diagram for describing a concept of deforming a gingival model according to movement of teeth, according to an embodiment.

The present specification describes principles of the present disclosure and sets forth embodiments thereof to clarify the scope of the present disclosure and to allow one of ordinary skill in the art to implement the present disclosure. The embodiments of the disclosure may be implemented in various forms.

Like reference numerals denote like elements throughout. The present specification does not describe all components in the embodiments, and common knowledge in the art or the same descriptions of the embodiments will be omitted below. Terms such as 'part' and 'portion' used herein denote those that may be embodied using software or hardware, and according to embodiments, a plurality of 'parts' or 'portions' may be embodied as a single unit or element, or a single 'part' or 'portion' may include a plurality of units or elements. Hereinafter, the operating principles and embodiments of the present disclosure will be described in detail with reference to the accompanying drawings.

In the present specification, an image may include an image showing at least one tooth or an intraoral cavity including the at least one tooth (hereinafter, referred to as an 'intraoral image').

Also, in the present specification, an image may be a two-dimensional (2D) image of an object or a three-dimensional (3D) model or 3D image representing the object in 3D. Furthermore, in this specification, the image may refer to data required to represent an object in 2D or 3D, such as raw data or the like obtained from at least one image sensor. Specifically, the raw data is data obtained to generate an intraoral image, and may be data (e.g., 2D data) obtained from at least one image sensor included in an intraoral scanner when scanning the inside of a patient's intraoral cavity, which is an object, by using the intraoral scanner.

In the present specification, an 'object' may include teeth, gingivae, at least a portion of an intraoral cavity, and/or artificial structures insertable into the intraoral cavity (e.g., an orthodontic appliance, an implant, artificial teeth, orthodontic auxiliary devices inserted into the intraoral cavity, etc.). In this case, the orthodontic appliance may include at least one of a bracket, an attachment, an orthodontic screw, a lingual orthodontic appliance, and a removable orthodontic retainer.

Hereinafter, embodiments are described in detail with reference to the drawings.

FIG. 1 is a diagram for describing a digital intraoral model processing system according to an embodiment of the disclosure.

Referring to FIG. 1, the digital intraoral model processing system may include a scanning device 50 and a data processing apparatus 100.

The scanning device 50 is a device that scans an object, and the object may include any body or object to be scanned. For example, the object may include at least a part of a patient's body including an intraoral cavity or face, or a tooth model. The scanning device may include a handheld scanner that scans an object while being held in a user's hand, or a model scanner that scans the object while moving around a tooth model placed therein.

An intraoral scanner 51 that is a type of handheld scanner may be a device for obtaining an image of an intraoral cavity including at least one tooth by being inserted into the intraoral cavity and scanning teeth in a non-contact manner. In addition, the intraoral scanner 51 may have a form that allows insertion in and withdrawal from the intraoral cavity, and scans the inside of a patient's intraoral cavity by using at least one image sensor (e.g., an optical camera, etc.). The intraoral scanner 51 may obtain information about a surface of an object as raw data in order to image the surface of the object, i.e., the surface of at least one of teeth and gingiva in the intraoral cavity and artificial structures insertable into the intraoral cavity (e.g., an orthodontic appliance including brackets, wires, etc., an implant, artificial teeth, orthodontic auxiliary devices inserted into the intraoral cavity, etc.). The intraoral scanner 51 is suitable for scanning the intraoral cavity as it is easily inserted into and withdrawn from the intraoral cavity, but may be used to scan body parts such as a patient's face, etc.

The scanning device 50 may obtain image data by using an optical triangulation method, a confocal method, or other methods.

The image data obtained by the scanning device 50 may be transmitted to the data processing apparatus 100 connected via a wired or wireless communication network.

The data processing apparatus 100 may be any electronic device that is connected to the scanning device 50 through a wired or wireless communication network and is capable of receiving a 2D image obtained by scanning the intraoral cavity from the scanning device 50, generating an intraoral image based on the received 2D image, and processing, displaying, and/or transmitting the intraoral image.

The data processing apparatus 100 may generate, based on 2D image data received from the scanning device 50, at least one of information and an intraoral image by processing the 2D image data, and display the generated information and intraoral image on a display.

The data processing apparatus 100 may be a computing device such as a smartphone, a laptop computer, a desktop computer, a personal digital assistant (PDA), and a tablet PC, but is not limited thereto.

Furthermore, the data processing apparatus 100 may exist in the form of a server (or a server apparatus) for processing an intraoral image.

In addition, the scanning device 50 may transmit raw data obtained through scanning to the data processing apparatus 100 before the raw data is not processed. In this case, the intraoral image processing apparatus 100 may generate, based on the received raw data, a 3D intraoral image representing the oral cavity in a 3D manner. Furthermore, a '3D intraoral image' according to an embodiment may be generated by modeling an internal structure of the oral cavity in 3D based on the received raw data, and thus may also be referred to as a '3D intraoral model', a 'digital intraoral model', or a '3D intraoral image'. Hereinafter, a model or image representing the oral cavity in 2D or 3D will be collectively referred to as an 'intraoral image'.

In addition, the data processing apparatus 100 may analyze, process, and display the generated intraoral image, and/or transmit the generated intraoral image to the display and/or an external device.

In another example, the scanning device 50 may obtain raw data through scanning, process the obtained raw data to generate an image corresponding to the oral cavity that is an object, and transmit the generated image to the data processing apparatus 100. In this case, the data processing apparatus 100 may analyze, process, display, and/or transmit the received image.

In an embodiment of the disclosure, the data processing apparatus 100 is an electronic device capable of generating and displaying an intraoral image representing an oral cavity including one or more teeth in 3D, and is described in detail below.

According to an embodiment, when receiving raw data obtained by scanning the oral cavity from the scanning device 50, the data processing apparatus 100 may process the received raw data to generate a 3D intraoral model. The raw data received from the scanning device 50 may include raw data representing teeth and raw data representing gingiva. Thus, the 3D intraoral model generated by the data processing apparatus 100 may include a tooth region representing the teeth and a gingival region representing the gingiva.

According to an embodiment, the data processing apparatus 100 may generate an initial tooth model and an initial gingival model, based on the tooth region and the gingival region included in the 3D intraoral model. For example, the initial tooth model and the initial gingival model may correspond to a patient's dental status before orthodontic treatment.

According to an embodiment, the data processing apparatus 100 may generate a target gingival model by deforming the initial gingival model by reflecting movement of one or more teeth included in the initial tooth model as the one or more teeth move. In this case, the data processing apparatus 100 may obtain a natural target gingival model by applying one or more control factors to prevent the gingiva from being excessively deformed when the movement of the teeth is reflected in the initial gingival model. For example, a target tooth model generated according to the movement of the one or more teeth included in the initial tooth model may correspond to a patient's dental status predicted after the orthodontic treatment. For example, the target gingival model may represent a modification of the initial gingival model to be suitable for the patient's dental status predicted after the orthodontic treatment.

According to an embodiment, the data processing apparatus 100 may display, on the display, together with the target tooth model, the target gingival model obtained via modification by applying one or more control factors when movement of teeth is reflected in the deformation of the gingiva. For example, the data processing apparatus 100 may display the gingiva that has been deformed to match a patient's dental status predicted after orthodontic treatment, together with the predicted patient's dental status, thereby allowing an image of the teeth and the gingiva after orthodontic treatment to be naturally provided to the patient. FIG. 2 is a reference diagram for describing a concept of deforming a gingival model according to movement of teeth, according to an embodiment.

Referring to FIG. 2, the data processing apparatus 100 may generate an initial intraoral model 200 based on raw data received from the scanning device 50.

The initial intraoral model 200 may include an initial tooth model 210 and an initial gingival model 220. The initial tooth model 210 may be generated based on a tooth region among the raw data obtained by scanning a patient's oral cavity. The initial gingival model 220 may be generated by processing a gingival region among the raw data obtained by scanning the patient's oral cavity.

The data processing apparatus 100 may obtain a target intraoral model 300 by processing the initial intraoral model 200. For example, the initial intraoral model 200 may represent a status of a patient's teeth at the time of scanning the patient's teeth, and the target intraoral model 300 may represent a status of expected target teeth, which may be obtained by performing orthodontic treatment on the patient's teeth. A tooth to be obtained by performing the orthodontic treatment may be referred to as a desired tooth, a target tooth, or an expected target tooth.

The target intraoral model 300 may include a target tooth model 310 and a target gingival model 320. The target tooth model 310 may be generated by reflecting movement of one or more teeth included in the initial tooth model 210 as they are moved from their initial positions to target positions. The target gingival model 320 may be obtained by deforming the initial gingival model 220 by reflecting movement of the one or more teeth included in the initial tooth model 210 as they are moved from the initial positions to the target positions.

The data processing apparatus 100 may obtain the target gingival model 320 by deforming the initial gingival model 220 by moving coordinates of vertices included in the initial gingival model 220 based on a displacement indicating the movement of the teeth. However, when the displacement indicating the movement of the teeth is reflected in the initial gingival model 220 as it is, deformation (morphing) of the gingiva according to the movement of the teeth may not occur naturally. For example, when the amount of movement of the teeth is large, the amount of movement of the teeth may excessively affect deformation of the gingiva, thereby distorting the shape of the deformed gingiva. For example, when one tooth moves to the left and another tooth moves to the right, and both movements are reflected in deformation of the gingiva, the gingiva may be deformed into a distorted shape. In addition, when one tooth is deleted, the amount of orthodontic movement increases and eventually the amount of movement of the gingiva increases, which may lead to an unnatural display. Furthermore, a portion where deformation is defined, such as rigid body transformation of a tooth, may not completely match a portion where deformation occurs, i.e., the gingiva. In addition, because a dental arch may be narrowed or widened as a whole by a tooth movement, it may be desirable that the tooth movement affects the entire dental arch as well as the gingiva around the tooth.

Therefore, when deforming a gingiva, a gingival deformation method or a gingival morphing method is required which is capable of suppressing excessive deformation as a whole while well reflecting a shape of the gingiva according to displacement of the tooth.

According to an embodiment, when deforming the gingiva, the data processing apparatus 100 may use one or more control factors 250 to better reflect the shape of the gingiva due to displacement of the tooth while suppressing excessive deformation as a whole. The one or more control factors 250 may include one or more control points, one or more stabilizers, base fixing, control of a rotation transformation component in the displacement of the tooth, etc. The data processing apparatus 100 may perform tooth deformation, for example, by applying one or more of the stated one or more control factors 250. The data processing apparatus 100 may perform gingival deformation by using one control factor among the stated control factors 250, by applying a combination of two or more of the stated control factors 250, or by applying all of the stated control factors 250.

According to an embodiment, the data processing apparatus 100 may place one or more control points at appropriate positions in the initial intraoral model, obtain displacement data from tooth movement information, and apply a mesh deformation method based on an approximation technique.

According to an embodiment, the data processing apparatus 100 may place one or more stabilizers in a space surrounding the initial intraoral model in order to suppress excessive deformation. In this way, by placing the one or more stabilizers in the space surrounding the initial intraoral model, it is possible to suppress excessive deformation of portions of gingiva far away from a portion where displacement is concentrated, for example, a portion where rigid body transformation of a tooth occurs.

According to an embodiment, the data processing apparatus 100 may impose a base fixing constraint such that a bottom surface of a gingival model, i.e., the other edge portion that is not an edge portion adjacent to teeth in the gingival model, behaves only in a horizontal direction. By base-fixing the bottom surface of the gingival model in this way, uneven distortion of the bottom surface of the gingival model may be suppressed.

According to an embodiment, the data processing apparatus 100 may appropriately adjust a magnitude of a rotation (angle) transformation component in displacement data obtained based on movement of a tooth. In this way, by controlling the magnitude of the rotation transformation component in the displacement data representing the movement of the tooth, excessive distortion and deformation of the gingiva due to rotation transformation of the tooth may be suppressed.

Figure 3:
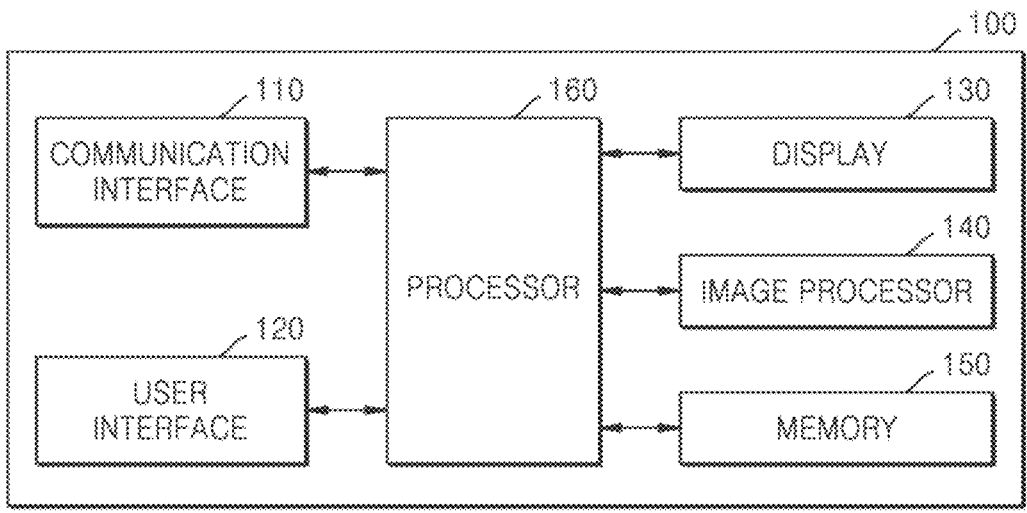
FIG. 3 is a block diagram illustrating a data processing apparatus according to an embodiment.

FIG. 3 is a block diagram illustrating the data processing apparatus 100 according to an embodiment.

Referring to FIG. 3, the data processing apparatus 100 may include a communication interface 110, a user interface 120, a display 130, an image processor 140, a memory 140, and a processor 160.

The communication interface 110 may perform communication with at least one external electronic device via a wired or wireless communication network. In detail, the communication interface 110 may perform communication with the scanning device 50 according to control by the processor 160. The communication interface 110 may perform, according to control by the processor 160, communication with an external electronic device or a server connected via the wired or wireless communication network.

The communication interface 110 may communicate with an external electronic device (e.g., an intraoral scanner, a server, an external medical device, or the like) via the wired or wireless communication network. In detail, the communication interface 110 may include at least one short-range communication module that performs communication according to a communication standard such as Bluetooth, Wi-Fi, Bluetooth Low Energy (BLE), near field communication (NFC)/radio frequency identification (RFID), Wi-Fi Direct, ultra-wideband (UWB), ZigBee, or the like.

In addition, the communication interface 110 may further include a long-range communication module that communicates with a server for supporting long-range communication according to long-range communication standards. In detail, the communication interface 110 may include a long-range communication module that performs communication via a network for Internet communication. Furthermore, the communication interface 110 may include a long-range communication module that performs communication via a communication network conforming to communication standards such as third generation (3G), fourth generation (4G), and/or fifth generation (5G).

In addition, the communication interface 110 may include at least one port for connecting to an external electronic device (e.g., an intraoral scanner, etc.) via a wired cable in order to communicate with the external electronic device in a wired manner. Accordingly, the communication interface 110 may perform communication with the external electronic device connected thereto in a wired manner through the at least one port.

The user interface 120 may receive a user input for controlling the data processing apparatus 100. The user interface 120 may include a user input device including a touch panel for sensing a user's touch, a button for receiving a user's push manipulation, a mouse or a keyboard for specifying or selecting a point on a user interface screen, etc., but is not limited thereto.

In addition, the user interface 120 may include a voice recognition device for performing voice recognition. For example, the voice recognition device may be a microphone, and receive a user's voice command or voice request. Accordingly, the processor 160 may control an operation corresponding to the voice command or voice request to be performed.

The display 130 displays a screen. In detail, the display 130 may display a certain screen according to control by the processor 160. In detail, the display 130 may display a user interface screen including an intraoral image generated based on data obtained by scanning a patient's oral cavity via the scanning device 50. Alternatively, the display 130 may display a user interface screen including information related to a patient's dental treatment.

The image processor 140 may perform operations for generating and/or processing images. Specifically, the image processor 140 may receive raw data obtained from the scanning device 50 and generate a 3D intraoral model based on the received data. The image processor 140 may be provided separately from the processor 160 as shown in FIG. 3, or it may be included in the processor 160.

The memory 150 may store at least one instruction. Furthermore, the memory 150 may store at least one instruction executed by the processor 160. Furthermore, the memory 150 may store at least one program executed by the processor 160. In addition, the memory 150 may store data received from the intraoral scanner (e.g., raw data obtained through intraoral scanning, etc.). Alternatively, the memory may store an intraoral image representing an oral cavity in 3D.

The processor 160 controls an intended operation to be performed by executing at least one instruction stored in the memory 150. In this case, the at least one instruction may be stored in an internal memory included in the processor 160 or the memory 150 included in the data processing apparatus separately from the processor.

In detail, the processor 160 may execute at least one instruction to control at least one component included in the data processing apparatus such that an intended operation is performed. Thus, even when it is described that the processor performs certain operations, it may be understood that the processor controls at least one component included in the data processing apparatus such that the certain operations are performed.

According to an embodiment, the processor 160 may execute one or more instructions stored in the memory 150 to obtain a tooth model and a gingival model from the 3D intraoral model, deform the gingival model by reflecting the amount of movement of gingiva based on a displacement indicating movement of one or more teeth included in the tooth model, and obtain a final gingival model by suppressing, using one or more control factors, at least a portion of the displacement indicating the movement of the teeth from being reflected in the amount of movement of the gingiva.

According to an embodiment, the amount of movement of the gingiva included in the final gingival model may include at least one of the amount of horizontal translation of the gingiva or the amount of rotation of the gingiva. According to an embodiment, the amount of the horizontal translation of the gingiva included in the final gingival model may be less than or equal to a value of a displacement indicating horizontal translation of the one or more teeth. According to an embodiment, the amount of the rotation of the gingiva included in the final gingival model may be less than or equal to a value of a displacement indicating rotation of the one or more teeth.

According to an embodiment, the processor 160 may execute one or more instructions stored in the memory 150 to place a plurality of control points in a space of the tooth model, determine the amount of movement of the plurality of control points according to the displacement indicating the movement of the one or more teeth, and deform the gingival model by reflecting the amount of the movement of the gingiva determined according to the amount of the movement of the plurality of control points.

According to an embodiment, the processor 160 may execute one or more instructions stored in the memory 150 to place the control points at different densities according to the displacement indicating the movement of the teeth. For example, a relatively large number of control points may be arranged in a region where a large amount of displacement indicating the movement of the teeth occurs, and a relatively small number of control points may be arranged in a region where a small amount of displacement indicating the movement occurs.

According to an embodiment, the processor 160 may execute one or more instructions stored in the memory 150 to place one or more control points on at least a part of a plane of a 3D figure surrounding the 3D intraoral model.

According to an embodiment, the processor 160 may execute one or more instructions stored in the memory 150 to serially place one or more control points on an axis of rotation of the teeth.

According to an embodiment, the processor 160 may execute one or more instructions stored in the memory 150 to place one or more stabilizers in a space surrounding the 3D intraoral model, thereby suppressing distorted deformation in the space surrounding the tooth model.

According to an embodiment, the stabilizer may represent a zero displacement constraint.

According to an embodiment, the processor 160 may execute one or more instructions stored in the memory 150 to suppress distortion of a bottom of the gingiva by performing base-fixing on at least a portion of the amount of the movement of the gingiva.

According to an embodiment, the base-fixing may be performed by controlling displacement on a Y axis indicating a tooth axis or an occlusal direction axis in the amount of movement of the bottom of the gingiva.

According to an embodiment, the processor 160 may execute one or more instructions stored in the memory 150 to reduce a rotation transformation component having an occlusal direction as an axis in the displacement indicating the movement of the teeth.

According to an embodiment, the processor 160 may execute one or more instructions stored in the memory 150 to identify a gingival region in the 3D intraoral model and create a virtual gingival base at an edge of the identified gingival region to thereby obtain the gingival model.

According to an embodiment, the processor 160 may execute one or more instructions stored in the memory 150 to display, on the display, the obtained final gingival model together with a final tooth model in which the movement of the one or more teeth included in the tooth model is represented. According to an embodiment, the processor 160 may be implemented in a form that internally includes at least one internal processor and a memory device (e.g., random access memory (RAM), read-only memory (ROM), etc.) for storing at least one of programs, instructions, signals, and data to be processed or used by the internal processor.

Furthermore, the processor 160 may include a graphics processing unit (GPU) for processing graphics corresponding to a video. Furthermore, the processor may be implemented as a system on chip (SOC) that integrates a core with the GPU. In addition, the processor may include more than a single core, i.e., multiple cores. For example, the processor may include dual-core, triple-core, quad-core, hexa-core, octa-core, deca-core, dodeca-core, hexadeca-core, etc.

In an embodiment of the disclosure, the processor 160 may generate an intraoral image based on a 2D image received from the scanning device 50.

Specifically, according to control by the processor 160, the communication interface 110 may receive data obtained by the scanning device 50, e.g., raw data obtained through intraoral scanning. Also, the processor 160 may generate a 3D intraoral image representing the intraoral cavity in 3D, based on the raw data received via the communication interface. For example, the intraoral scanner may include at least one camera to reconstruct a 3D image according to an optical triangulation method, and in a specific embodiment, it may include a left camera L corresponding to a left field of view and a right camera R corresponding to a right field of view. In addition, the intraoral scanner may respectively obtain left image data corresponding to the left field of view and right image data corresponding to the right field of view from the left camera L and the right camera R. Subsequently, the intraoral scanner (not shown) may transmit raw data including the left image data and the right image data to the communication interface of the data processing apparatus 100.

The communication interface 110 may then transmit the received raw data to the processor, and the processor may generate, based on the received raw data, an intraoral image representing the intraoral cavity in 3D.

Furthermore, the processor 160 may control the communication interface 110 to receive an intraoral image representing the intraoral cavity in 3D directly from an external server, a medical device, or the like. In this case, the processor may obtain a 3D intraoral image without generating a 3D intraoral image based on the raw data.

According to the embodiment of the disclosure, when the processor 160 performs operations such as 'extraction', 'obtaining', and 'generation', this may include not only a case where the processor 160 directly performs the above-described operations by executing at least one instruction but also a case where the processor 160 controls other components so that the operations are performed.

In order to implement the embodiments presented in the present disclosure, the data processing apparatus 100 may include only some of the components shown in FIG. 3 or include more components than those shown in FIG. 3.

Furthermore, the data processing apparatus 100 may store and execute dedicated software linked to the intraoral scanner. Here, the dedicated software may be referred to as a dedicated program, a dedicated tool, or a dedicated application. When the data processing apparatus 100 operates in conjunction with the scanning device 50, the dedicated software stored in the data processing apparatus 100 may be connected to the scanning device 50 to receive in real time data obtained through intraoral scanning. For example, Medit's i500 intraoral scanner is equipped with dedicated software for processing data obtained through intraoral scanning. Specifically, Medit has produced and distributed 'Medit Link' which is software for processing, managing, using, and/or transmitting data obtained from its intraoral scanner (e.g., the i500 intraoral scanner). Here, because 'dedicated software' means programs, tools, or applications that work in conjunction with an intraoral scanner, various intraoral scanners developed and sold by various manufacturers may also share and use the dedicated software. In addition, the dedicated software may be produced and distributed separately from an intraoral scanner for performing intraoral scanning.

The data processing apparatus 100 may store and execute the dedicated software corresponding to the i500 product. The dedicated software may perform at least one operation for obtaining, processing, storing, and/or transmitting an intraoral image. Here, the dedicated software may be stored in the processor. In addition, the dedicated software may provide a user interface for use of data obtained from an intraoral scanner. In this case, a user interface screen provided by the dedicated software may include an intraoral image generated according to an embodiment of the disclosure.

FIG. 4 is a flowchart of a method, performed by a data processing apparatus, of processing a 3D intraoral model, according to an embodiment of the disclosure. The method of processing a 3D intraoral model, which is illustrated in FIG. 4, may be performed by the data processing apparatus 100. Therefore, the flowchart of the method of processing a 3D intraoral model, which is illustrated in FIG. 4, may be a flowchart showing operations of the data processing apparatus 100.

Referring to FIG. 4, in operation 410, the data processing apparatus 100 may obtain a 3D intraoral model.

The data processing apparatus 100 may receive raw data obtained by scanning the inside of a patient's intraoral cavity or by scanning a tooth model from the scanning device 50, and process the received raw data to obtain a 3D intraoral model including a tooth region and a gingival region.

Figure 5:
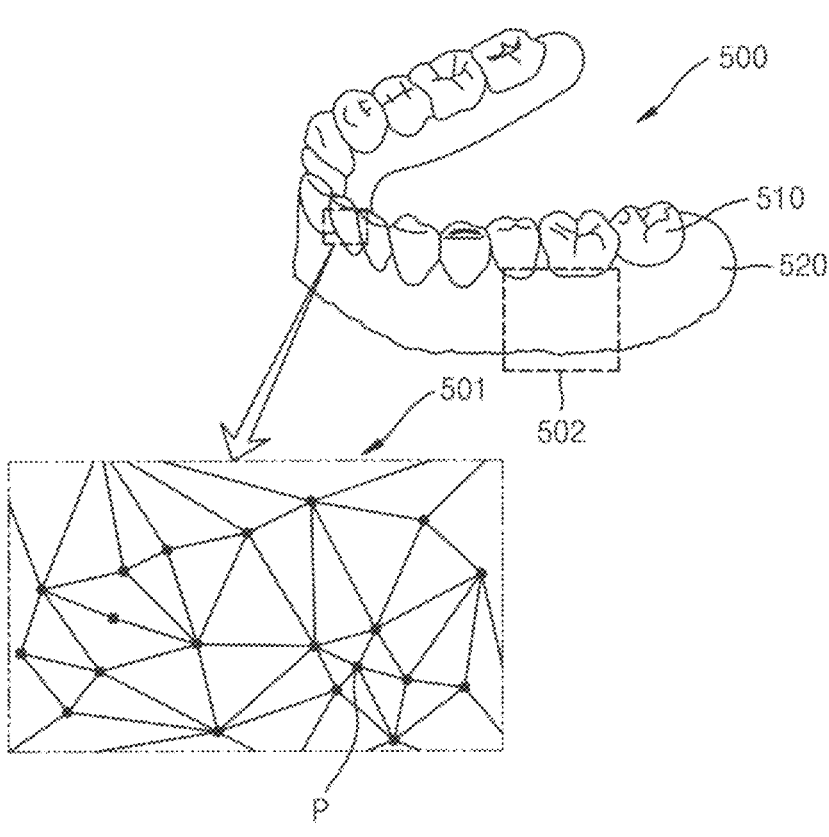
FIG. 5 shows an example of a 3D intraoral model obtained by a data processing apparatus, according to an embodiment.

FIG. 5 shows an example of a 3D intraoral model obtained by the data processing apparatus 100, according to an embodiment.

For example, when 2D data is obtained using an intraoral scanner, the data processing apparatus 100 may calculate coordinates of a plurality of illuminated surface points by using a triangulation method. By scanning an object using the intraoral scanner while the intraoral scanner moves over a surface of the object, coordinates of surface points may be accumulated as the amount of scan data increases. As a result of such image acquisition, a point cloud of vertices may be identified to represent the extent of the surface. Points in the point cloud may represent actual measured points on a 3D surface of the object. A surface structure may be approximated by forming a polygonal mesh in which adjacent vertices in the point cloud are connected by line segments. A polygonal mesh may be determined in various shapes including a triangular mesh, a quadrilateral mesh, a pentagonal mesh, etc. A polygon of such a mesh model and relationships between neighboring polygons may be used to extract features of tooth boundaries, such as curvatures, minimum curvatures, edges, spatial relations, etc.

Referring to FIG. 5, a region 501 of a 3D intraoral model 500 may be composed of a plurality of vertices constituting a point cloud and a triangular mesh created by connecting adjacent vertices with lines.

Referring to FIG. 5, the 3D intraoral model 500 may include a tooth region 510 and a gingival region 520. In the case of the tooth region 510, a perfect shape of a tooth may be obtained by scanning the tooth by using the scanning device 50 while it moves around the tooth. In the case of the gingival region 520, because the gingiva that is a part between the teeth and other mucous membranes in the intraoral cavity has a low height, and an opposite edge portion 502, which is not a part where the gingiva is adjacent to the tooth, is connected to the other mucous membranes, it is difficult to scan the gingival region 520 smoothly, so the gingival region 520 is not smoothly displayed, as shown in FIG. 5.

Referring back to FIG. 4, in operation 420, the data processing apparatus 100 may identify a tooth region and a gingival region in the 3D intraoral model.

The 3D intraoral model 500 obtained in operation 410 has a form that includes the tooth region 510 and the gingival region 520 as a single unit. In order for the data processing apparatus 100 to perform various processing or treatments by using the teeth included in the 3D intraoral model 500, the tooth region 510 and the gingival region 520 need to be segmented from the 3D intraoral model 500.

According to an embodiment, the data processing apparatus 100 may segment the 3D intraoral model 500 into the tooth region 510 and the gingival region 520 based on a curvature distribution. According to another embodiment, the data processing apparatus 100 may automatically segment the 3D intraoral model 500 into the tooth region 510 and the gingival region 520 by using a neural network based on artificial intelligence (AI). A neural network for segmenting a tooth region and a gingival region may be obtained by learning a criterion for segmenting a tooth region and a gingival region from a 3D intraoral model.

Figure 6:
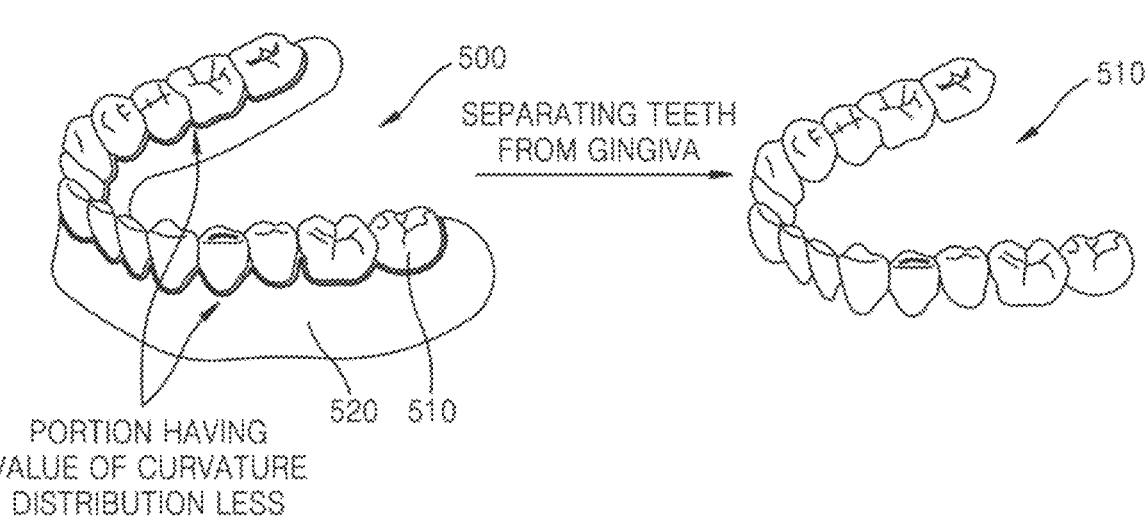
FIG. 6 is a reference diagram for describing a method of segmenting a 3D intraoral model into a tooth region and a gingival region, according to an embodiment.

FIG. 6 is a reference diagram for describing a method of segmenting a 3D intraoral model into a tooth region and a gingival region, according to an embodiment.

Referring to FIG. 6, the data processing apparatus 100 may separate the tooth region 510 from the gingival region 520 by segmenting the 3D intraoral model 500 according to a curvature distribution. The data processing apparatus 100 may determine an appropriate curvature threshold to be used for separating a boundary between the tooth region 510 and the gingival region 520, and separate a portion having a curvature value less than the determined curvature threshold to thereby separate the tooth region 510 from the gingival region 520.

Referring back to FIG. 4, in operation 430, the data processing apparatus 100 may generate a gingival model by creating a gingival base in the identified gingival region.

As described above with reference to FIG. 5, in the 3D intraoral model obtained by scanning the patient's intraoral cavity, a gingival region has a low height with an uneven boundary. Therefore, the data processing apparatus 100 may generate the gingival model by adding the gingival base to the gingival region.

Figure 7:
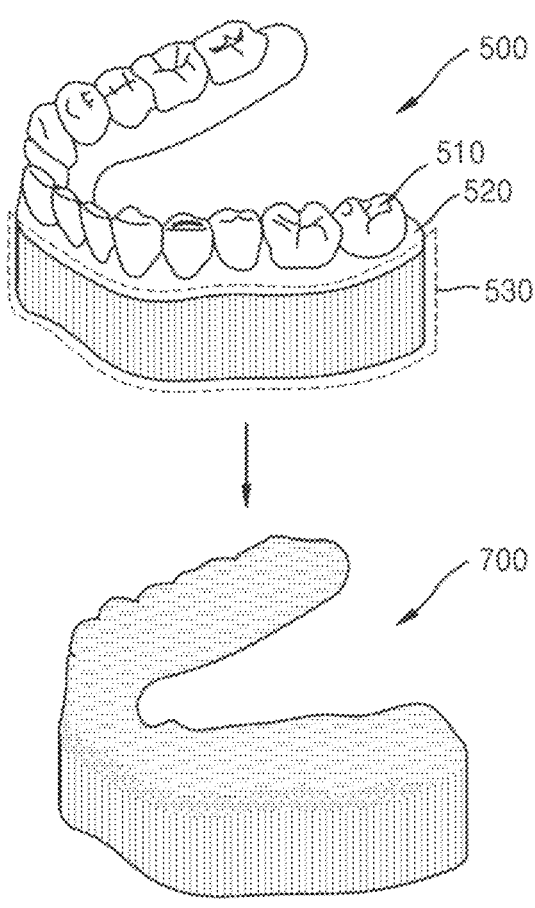
FIG. 7 is a reference diagram for describing a method of generating a gingival model, according to an embodiment.

FIG. 7 is a reference diagram for describing a method of generating a gingival model, according to an embodiment.

Referring to FIG. 7, the data processing apparatus 100 may trim a blurry edge portion of the gingival region 520 separated from the tooth region 510, i.e., a portion where data is not clearly displayed, and create a virtual side wall 530 connected to the gingival region 520. Because a 3D virtual model is composed of vertices, the virtual side wall may be created by generating vertices constituting the side wall to be connected to the gingival region 520.

Then, the data processing apparatus 100 may generate a gingival model 700 by filling a gap region created by the missing tooth portion by using an implicit surfacing technique. The gingival model 700 may also be referred to as a gingival base. The data processing apparatus 100 may fill the side wall and the gap-filled region with an appropriate color.

Referring back to FIG. 4, in operation 440, the data processing apparatus may individualize each tooth in the identified tooth region.

As described with reference to FIG. 6, the 3D intraoral model 500 may be segmented into the tooth region 510 and the gingival region 520. The separated tooth region 510 represents a state in which a plurality of teeth exist as a single unit. For processing such as deleting or moving a tooth in a tooth region or inserting an additional tooth, it is necessary to individualize each tooth in the tooth region and obtain information about each tooth.

According to an embodiment, the data processing apparatus 100 may individualize teeth in the tooth region by using a tooth model template. According to another embodiment, the data processing apparatus 100 may individualize the teeth in the tooth region by using a neural network based on AI.

Figure 8:
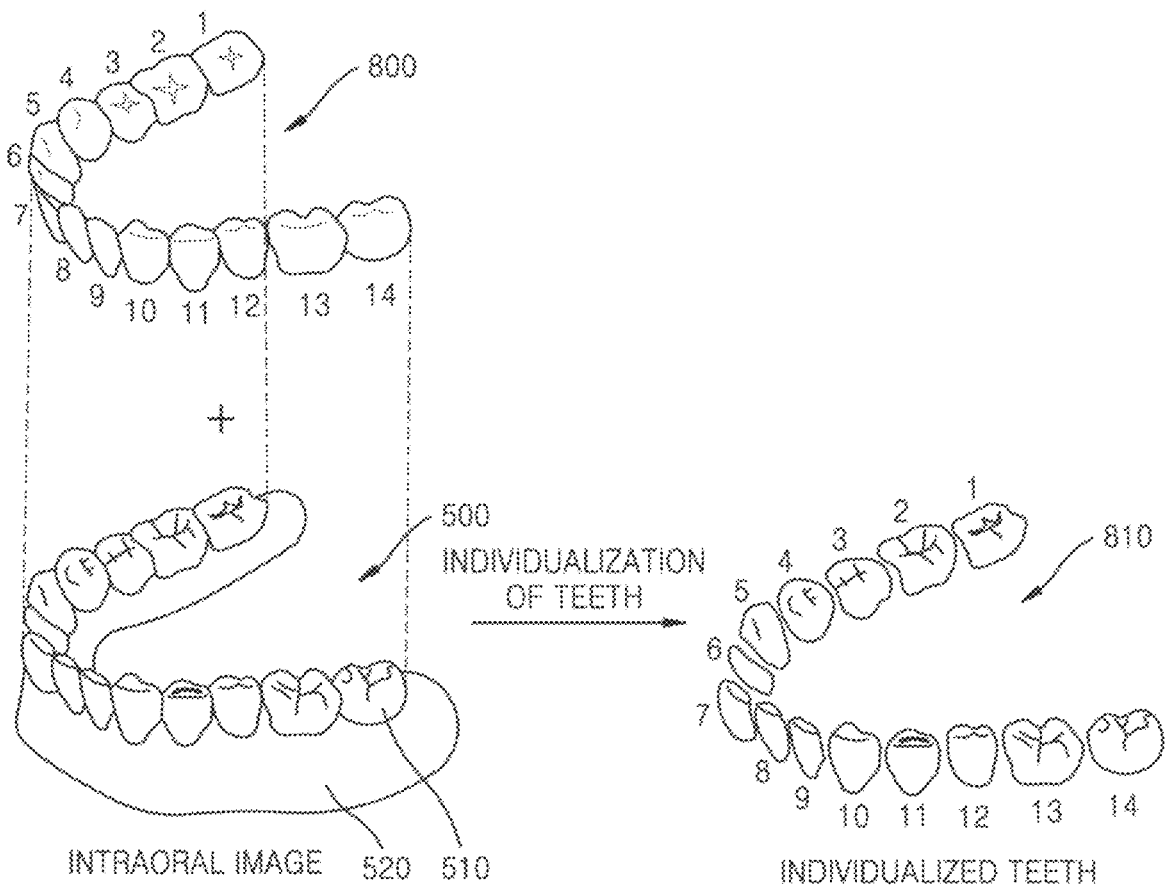
FIG. 8 is a reference diagram for describing a method of individualizing teeth in a tooth region, according to an embodiment.

FIG. 8 is a reference diagram for describing a method of individualizing teeth in a tooth region, according to an embodiment.

Referring to FIG. 8, a tooth model template 800 represents template model data in which teeth have ideal shapes and are arranged in ideal positions, and each of the teeth is numbered For example, each tooth in the tooth model template 800 is numbered from 1 to 14 starting with number 1 on the left.

The data processing apparatus 100 may individualize teeth in the tooth region 510 by performing data processing on the teeth in the tooth region 510 by using the tooth model template 800 and obtain the individualized teeth 810. Individualizing teeth in an intraoral image may refer to separating the teeth in the tooth region 510 from each other and obtaining information about each of the teeth. Information about each tooth may include information about a shape of each tooth, information about a position of each tooth, and information about a number assigned to each tooth. Individualization of teeth in a tooth region may also be referred to as segmentation of teeth, subdivision of teeth, or the like. By individualizing the teeth in the tooth region in this way, the data processing apparatus 100 may use the individualized teeth 810 to delete or move each tooth or insert an additional tooth.

According to an embodiment, after individualizing the teeth, the data processing apparatus 100 may create a complete shape of each of the individualized teeth. A large part of the mesh transformation as described below is imposition of displacement constraints. This may be created from a complete shape of an individual tooth and the amount of rigid body transformation of the tooth. Accordingly, it may be desirable for the data processing apparatus 100 to create the complete shape of an individualized tooth. The complete shape of an individual tooth may be created by generating a tooth root and connecting the tooth root to a scanned tooth.

Figure 9:
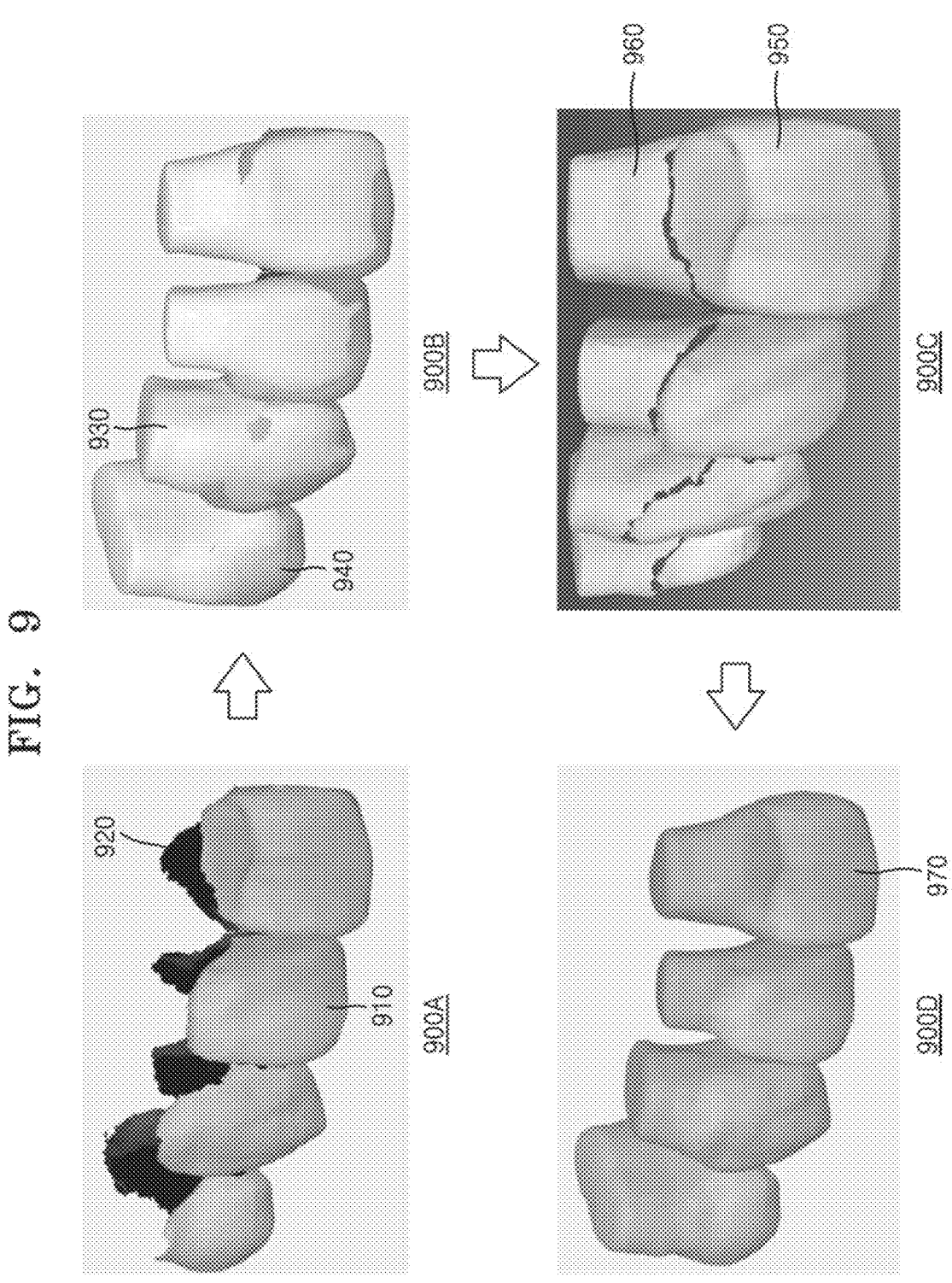
FIG. 9 shows an example of a method for creating a complete shape of an individualized tooth, according to an embodiment.

FIG. 9 shows an example of a method for creating a complete shape of an individualized tooth, according to an embodiment.

Referring to FIG. 9, 900A shows a state in which a gingival region has been removed from tooth scan data. Although surface data 910 of a tooth is obtained and represented by scanning the tooth with a scanning device, a back surface 920 of the tooth is displayed in black after the gingival region is removed due to structural characteristics of scan data.

A tooth template 930 may be aligned with each tooth to create a complete shape of an individualized tooth. Because the tooth template 930 includes a tooth crown as well as a tooth root, when the tooth template is aligned with the tooth scan data, overlapping and non-overlapping regions between the tooth scan data and the tooth template may occur. Because the tooth scan data does not include a tooth root, the tooth root in the tooth template may be a non-overlapping region, and a tooth crown in the tooth scan data and the tooth crown in the tooth template may be an overlapping region (900B).

When the data processing apparatus 100 aligns the tooth template 930 with the tooth scan data, various alignment algorithms such as an iterative closest point (ICP) algorithm may be used. The ICP is an algorithm for minimizing a distance between two point clouds, and is used to reconstruct 2D or 3D surfaces from different scan data. The ICP algorithm keeps a point cloud called a reference fixed while transforming a point cloud called a source to best match the reference. The ICP algorithm may align 3D models by iteratively refining transformation (a combination of translation and rotation) required to minimize an error metric representing a distance from the source to the reference. Various algorithms as well as ICP may be used as an alignment algorithm, and for example, the Kabsch algorithm may be used.

The data processing apparatus 100 may leave intact a region in the aligned tooth template, i.e., a tooth root region 960, which does not overlap with a portion 950 of the tooth scan data, while deleting a portion of the tooth template overlapping with the portion of the tooth scan data (900C).

Subsequently, the data processing apparatus 100 may obtain an individual tooth 970 with a root complemented by merging the portion of the tooth scan data, i.e., the tooth crown, with the tooth root region in the tooth template by using an implicit surfacing technique (900D).

Referring back to FIG. 4, in operation 450, the data processing apparatus 100 may obtain target tooth model and obtain, based on initial tooth model and the target tooth model, displacement indicating movement of tooth in tooth region to target position.

In operation 460, the data processing apparatus 100 may modify gingival model by reflecting amount of movement of gingiva according to displacement indicating movement of tooth and obtain final gingival model by one or more control factors.

FIG. 10 is a flowchart of a method of deforming a gingival model, according to an embodiment.

Referring to FIG. 10, in operation 1010, the data processing apparatus 100 may obtain a tooth model and a gingival model from a 3D intraoral model obtained by scanning teeth. For example, a tooth model and a gingival model may be obtained as described above with reference to FIGS. 4 to 9. The tooth model and the gingival model from the 3D intraoral model obtained based on raw data received from the scanning device 50 indicate an initial state before any tooth movement has occurred, so they may also be referred to as an initial tooth model and initial gingival model, or a scanned tooth model and a scanned gingival model.

In operation 1020, the data processing apparatus 100 may deform the gingival model by reflecting the amount of movement of gingiva according to a displacement indicating movement of the teeth.

The data processing apparatus 100 may generate a target tooth model based on the initial tooth model to represent movement of the teeth. A method of generating a target tooth model based on an initial tooth model is not described in detail because it is out of the scope of the present specification. The movement of the teeth represents movement of teeth included in the initial tooth model from their initial positions to desired positions or target positions. For example, the initial tooth model may represent a tooth model before orthodontic treatment, and the target tooth model may represent a tooth model predicted after orthodontic treatment.

In the real world, when teeth arrangement is corrected, rigid body transformation for hard teeth and deformation for gingiva surrounding the teeth take place over several months to several years. In order for orthodontic software to give an appropriate level of feasibility to user experience (UX) to be provided to a user, it is natural to apply rigid body transformation to teeth and deformation to the gingiva, just like in the real world. Thus, the data processing apparatus 100 may deform an initial gingival model by reflecting the amount of movement of the gingiva according to the displacement indicating the movement of the teeth. The rigid body transformation of the teeth may be defined using a 3D registration technique, and a mesh deformation technique may be applied to the deformation of the gingiva.

In operation 1030, the data processing apparatus 100 may obtain a final gingival model by suppressing, using one or more control factors, at least a part of the displacement indicating the movement of the teeth from being reflected in the amount of movement of the gingiva.

As in operation 1020, when the mesh deformation of the gingival model is performed by determining the amount of movement of the gingiva only based on the displacement indicating the movement of the teeth, a shape of the gingiva according to the deformed gingival model may not be natural. For example, when there is a lot of tooth movement, if it is applied to the gingival deformation as it is, the shape of the gingiva may be twisted or distorted. Therefore, according to an embodiment of the disclosure, the data processing apparatus 100 may suppress at least a part of the displacement indicating the movement of the teeth from being reflected in the amount of movement of the gingiva by applying one or more control factors when performing gingival deformation.

The one or more control factors may include one or more control points, one or more stabilizers, base fixing, control of a rotation transformation component in the displacement of the teeth, etc. For example, the data processing apparatus 100 may perform gingival deformation by applying one or more of the stated one or more control factors. For example, the data processing apparatus 100 may perform gingival deformation by using one control factor among the stated control factors, by applying a combination of two or more of the stated control factors, or by applying all of the stated control factors 250.

As the control factors are applied in this way, the amount of movement of the gingiva included in the final gingival model may include at least one of the amount of horizontal translation of the gingiva or the amount of rotation of the gingiva.

The amount of the horizontal translation of the gingiva included in the final gingival model may be less than or equal to a value of a displacement indicating horizontal translation of one or more teeth. The horizontal translation of the teeth or gingiva may mean horizontally moving the teeth or gingiva in a direction perpendicular to an occlusal direction. For example, referring to FIG. 15, the horizontal translation may indicate horizontally moving the teeth or gingiva in at least one of a distal direction, a mesial direction, a buccal direction, and a lingual direction.

The amount of the rotation of the gingiva included in the final gingival model may be less than or equal to a value of a displacement indicating rotation of the one or more teeth. The rotation of the gingiva may refer to rotation of the gingiva around an axis in a direction parallel to the occlusal direction. For example, referring to FIG. 15, the rotation may indicate rotation of the teeth or gingiva about at least one of a distal-mesial direction axis, a buccal-lingual direction axis, and an occlusal direction axis.

According to an embodiment, the data processing apparatus 100 may display, on the display, the obtained final gingival model together with a final tooth model representing the movement of the one or more teeth included in the tooth model.

Figure 11:
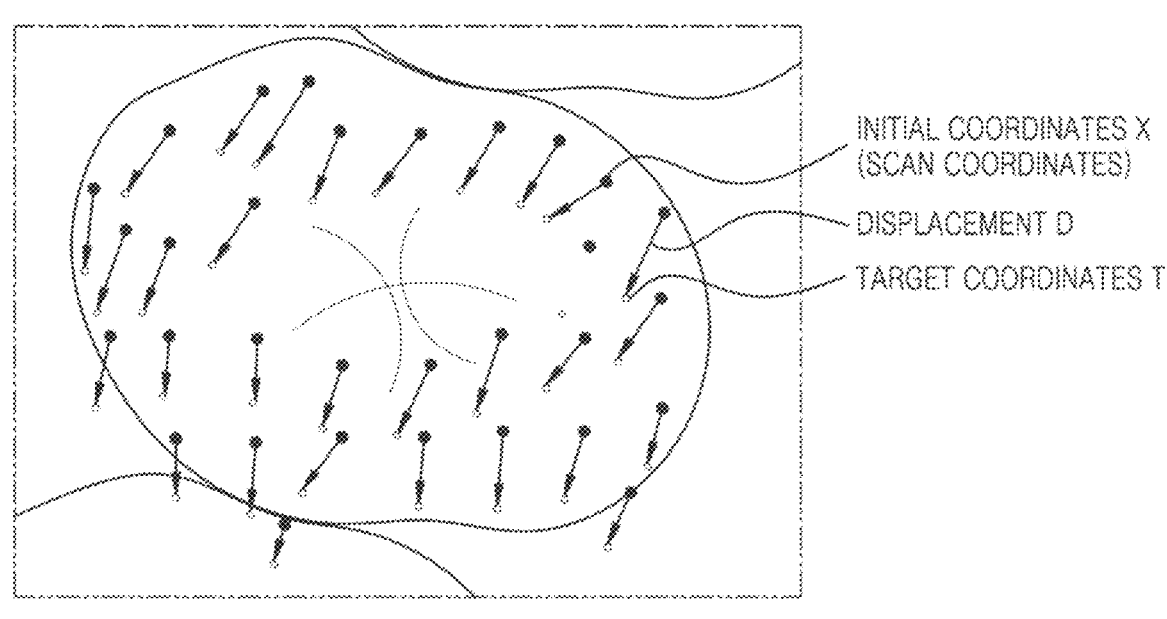
FIG. 11 is a reference diagram for describing a displacement indicating movement of a tooth, according to an embodiment.

FIG. 11 is a reference diagram for describing a displacement indicating movement of a tooth, according to an embodiment.

Referring to FIG. 11, a displacement of one tooth included in a tooth model is shown. The tooth in the tooth model is composed of a plurality of vertices, and movement of the tooth may be described as a change in positions of these vertices. In the teeth shown in FIG. 11, an initial position of the tooth, i.e., an initial position of a vertex constituting the tooth is indicated by a black dot, and a target position to which the corresponding vertex moves is indicated by a white dot. A displacement indicating movement of each vertex is indicated by an arrow.

For example, initial positions of the vertices may be denoted by $\{X1, X2, X3, X4, X5, \ldots Xn\}$, target positions reached by moving the vertices are denoted by $\{T1, T2, t3, T4, T5, \ldots Tn\}$, and Displacements representing the movement of the vertices from the initial positions to the target positions may be denoted by $\{D1, D2, D3, D4, D5, \ldots Dn\}$.

Gingival deformation may be induced based on a set of these displacements.

Each tooth included in the gingival model has an infinite number of vertices, and gingival deformation may be induced by using displacements of a predetermined number of vertices among the vertices included in each tooth. Here, the predetermined number may be variously determined. For example, the data processing apparatus 100 may extract 100 vertices for each tooth and use displacements of these vertices.

Hereinafter, a method of using one or more control factors in gingival deformation is described.

Figure 12:
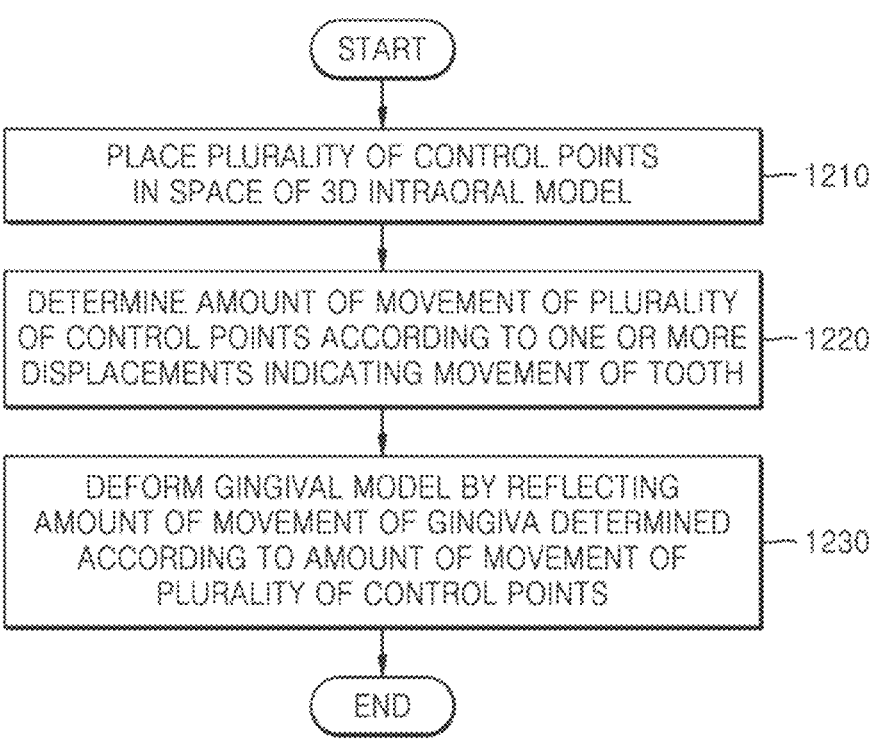
FIG. 12 is a flowchart of a method of obtaining a final gingival model by using control points as a control factor, according to an embodiment.

FIG. 12 is a flowchart of a method of obtaining a final gingival model by using control points as a control factor, according to an embodiment.

Referring to FIG. 12, in operation 1210, the data processing apparatus 100 may place a plurality of control points in a space of a 3D intraoral model.

The space of the 3D intraoral model may include the 3D intraoral model including a tooth model and a gingival model and a space occupied by a 3D figure surrounding the 3D intraoral model.

According to an embodiment, the data processing apparatus 100 may place the plurality of control points in the space created by the 3D figure surrounding the 3D intraoral model, or in portions of a tooth region and a gingival region included in the 3D intraoral model.

The control points are for representing the transformation/distortion of a space and may be each composed of 3D coordinates and several coefficients. These control points may determine the degree of freedom and characteristics of deformation, such as where local large deformation may occur in a portion where these control points are densely arranged, while a gradual change occurs in a portion where the control points are sparsely arranged.

According to an embodiment, the data processing apparatus 100 may place control points in a space of a volume surrounding the 3D intraoral model. Positions where the control points are arranged are not limited to any specific positions, and the control points may be arranged at least some positions on a plane of the 3D figure representing the space surrounding the 3D intraoral model. For example, the data processing apparatus 100 may place a total of 8 control points by arranging one control point at each vertex constituting the 3D figure surrounding the 3D intraoral model, but the number is not limited thereto. In this case, the data processing apparatus 100 may not place the control points near a bottom of the gingival model to suppress local deformation of a bottom surface of the gingival model, i.e., a gingival base.

According to an embodiment, the data processing apparatus 100 may place one or more control points for each tooth to reflect displacement of each tooth. The data processing apparatus 100 may serially place one or more control points for each tooth. For example, the data processing apparatus 100 may serially place four control points for each tooth. The four control points are merely an example, and the data processing apparatus 100 may variously determine the number and positions of control points serially arranged on each tooth. For example, the data processing apparatus 100 may variously determine the number of control points serially arranged on each tooth as two, three, four, or more According to an embodiment, the data processing apparatus 100 may serially place four control points around an occlusal axis for each tooth. This serial placement of the control points around the occlusal axis is intended to reflect rotation of the tooth around the occlusal axis less in the amount of movement of the gingiva. This is intended to reduce the effect of rotation transformation of the tooth because the rotation transformation of the tooth causes excessive distortion deformation of the gingiva in many cases. The four control points arranged serially on the occlusal axis may include, for example, a first control point arranged at a position that is an intersection between a gingival volume and an occlusal line, a second control point arranged at a position corresponding to a tip of the tooth, a third control point arranged at a position where the gingiva and the tooth meet, and a fourth control point arranged at a position of a tooth root of the tooth.

Figure 13:
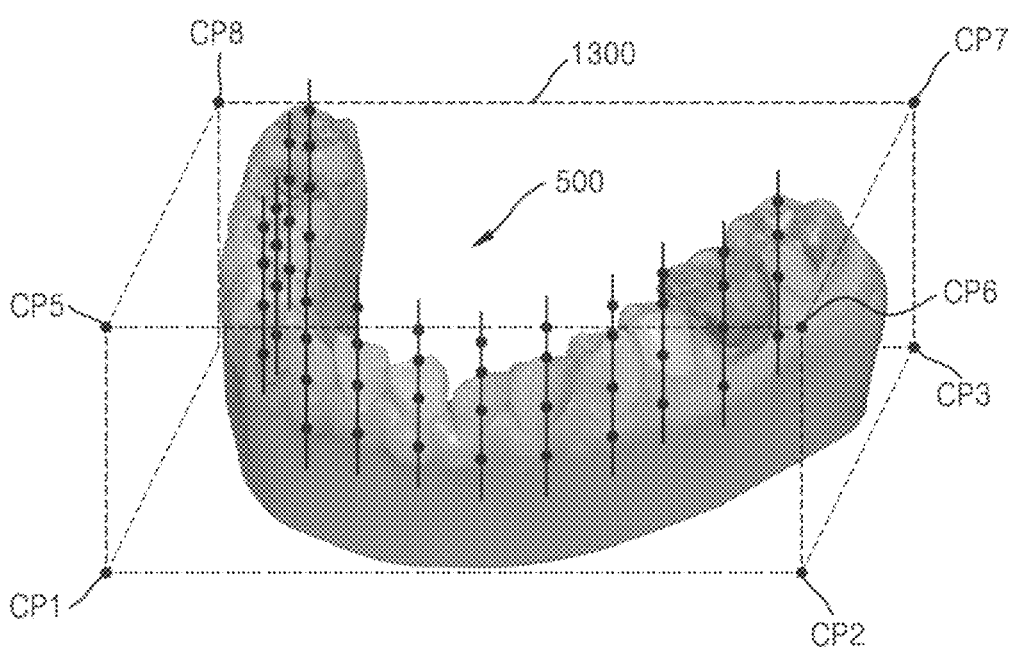
FIG. 13 shows an example of a plurality of control points arranged in a space of a 3D intraoral model, according to an embodiment.

FIG. 13 shows an example of a plurality of control points arranged in a space of a 3D intraoral model, according to an embodiment.

Referring to FIG. 13, the data processing apparatus 100 may place vertex control points CP1, CP2, CP3, CP4, CP5, CP6, CP7, and CP8 of a 3D figure representing a space (volume) 1300 surrounding the 3D intraoral model.

Also, the data processing apparatus 100 may place a plurality of control points for each tooth to reflect displacement of each tooth. For example, four control points may be arranged on each tooth. When the control points are arranged according to this example, a total of 64 control points may be arranged which include 8 control points respectively at vertices of the 3D figure representing the space (volume) 1300 surrounding the 3D intraoral model and 4 control points for each tooth*14 (assuming that the number of teeth is 14), but the number is not limited thereto. A different number of control points may be arranged for each tooth.

Figure 14:
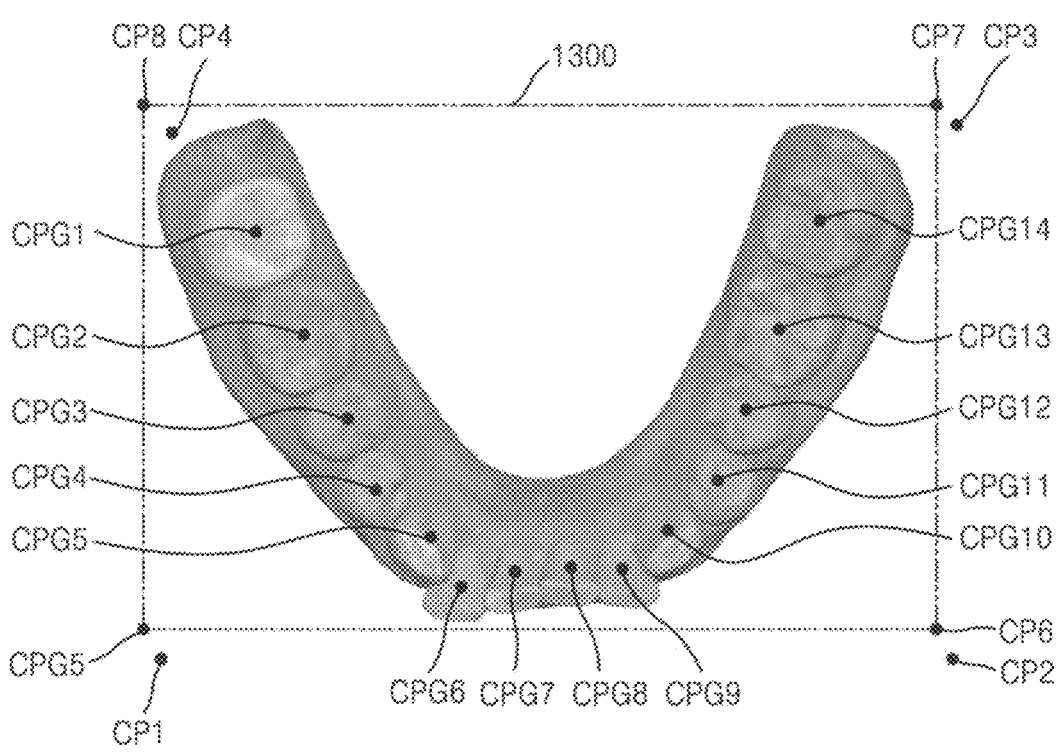
FIG. 14 is a reference diagram for describing positions of control points arranged on each tooth, according to an embodiment.

FIG. 14 is a reference diagram for describing positions where control points are arranged on each tooth, according to an embodiment.

FIG. 14 is a top view of the space of the 3D intraoral model of FIG. 13. Referring to FIG. 14, a control point group (CPG) may be arranged on each tooth in the 3D intraoral model. A CPG arranged on each tooth may include one or more control points. As described above with reference to the example of FIG. 13, the number of control points on each tooth may be 4, and in this case, the CPG may include 4 control points. FIG. 14 shows an CPG CPG1 corresponding to a first tooth, a CPG CPG2 corresponding to a second tooth, . . . , and a CPG CPG14 corresponding to a fourteenth tooth as CPGs respectively corresponding to teeth. A CPG corresponding to each tooth may be arranged on a central axis in an occlusal direction of the corresponding tooth.

Because the degree of inclination of an occlusal direction is different depending on the occlusal surface for each tooth, specifically, the occlusal direction may be different for each tooth. According to an embodiment, the data processing apparatus 100 may place a CPG on a central axis in an occlusal direction corresponding to each tooth by taking into account a different occlusal direction for each tooth. Alternatively, according to another embodiment, the data processing apparatus 100 may place a CPG on a central axis in the same occlusal direction for all teeth by calculating an average of occlusal directions of all the teeth.

Figure 15:
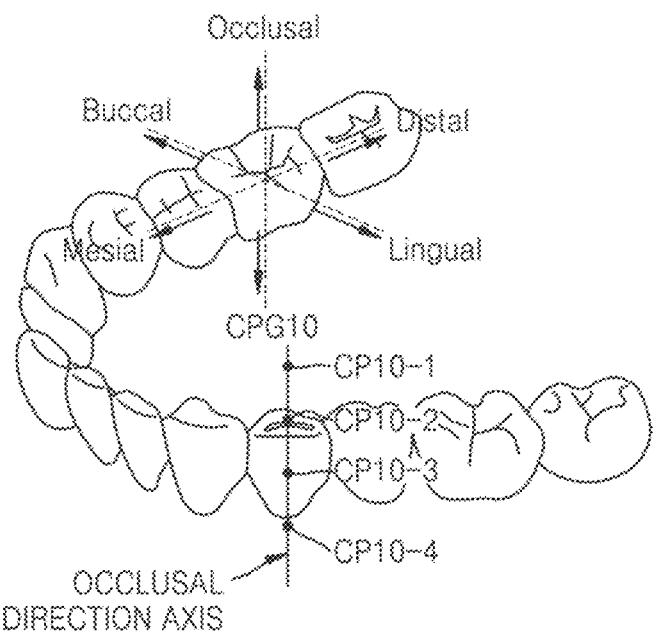
FIG. 15 shows an example of control points arranged on each tooth, according to an embodiment.

FIG. 15 shows an example of control points arranged on each tooth, according to an embodiment.

According to an embodiment, the data processing apparatus 100 may place a plurality of control points for each tooth. The plurality of control points arranged for each tooth may or may not be on a straight line.

According to an embodiment, the data processing apparatus 100 may serially place control points for each tooth in an occlusal direction. For each tooth, Buccal may indicate a direction adjacent to the inside of the cheek, Lingual may indicate a direction adjacent to the tongue, Distal indicates a direction away from a midline along a dental arch, Mesial indicates a direction toward the midline along the dental arch, and Occlusal indicates a direction toward an occlusal surface.

According to an embodiment, the data processing apparatus 100 may serially place control points for each tooth on a central axis of the tooth in the occlusal direction. When the control points are arranged in this way, displacement for inclination of the tooth may be reflected in the amount of movement of gingiva, while a tooth rotation transformation component may be reflected to a small degree. This is to prevent the surrounding gingiva from being distorted due to an increase in the tooth rotation transformation component.

An example of a CPG CPG10 arranged on tooth #10 is described with reference to FIG. 15.

For convenience of description, an axis having a direction parallel to the occlusal direction and passing through a center of the tooth is referred to as an occlusal direction axis. According to an embodiment, control points in a CPG corresponding to each tooth may be arranged along the occlusal direction axis. According to an embodiment, control points corresponding to each tooth may be arranged at positions that can well reflect displacement of the tooth. For example, as shown in FIG. 15, the CPG CPG10 corresponding to the tooth #10 may include four control points CP10-1, CP10-2, CP10-3, and CP10 along the occlusal direction axis of the tooth #10. For example, the control point CP10-1 may be arranged at a position that is an intersection between a gingival volume and the occlusal axis. The control point CP10-2 may be arranged at a position corresponding to a tip of the tooth. The control point CP10-3 may be arranged at a position where the gingiva and the tooth meet. The control point CP10-4 arranged at a position of a tooth root of the tooth. Although FIG. 15 shows that the control points are arranged on tooth #10 for convenience of description, control points may be arranged in the same manner as on other teeth.

While FIG. 15 illustrates an exemplary placement of the four control points on each tooth, the number of control points arranged thereon may be less than or greater than 4.

While FIG. 15 illustrates an exemplary placement of control points on each tooth in a row, the present disclosure is not necessarily limited thereto, and control points on each tooth may not be located in a row.

Figure 16:
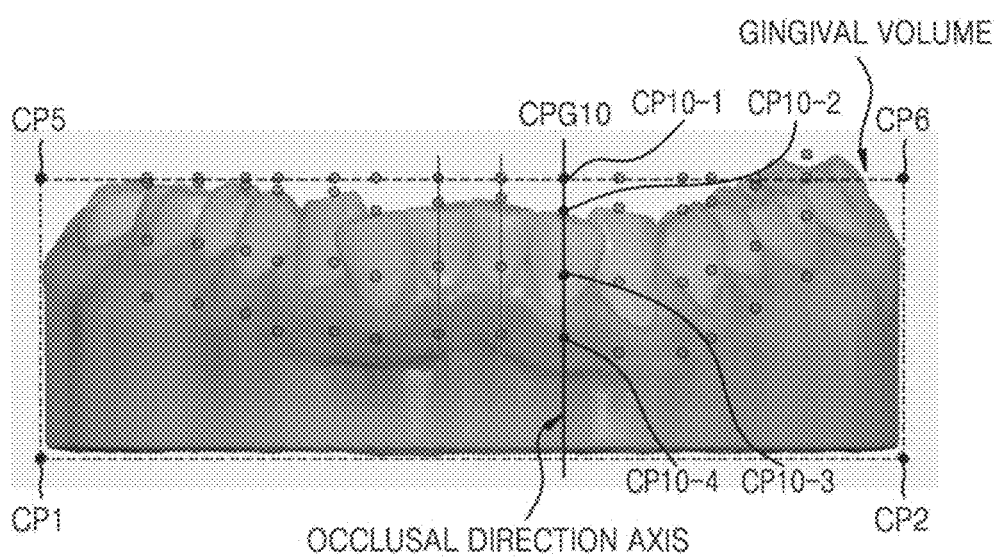
FIG. 16 is a reference diagram for describing positions of control points arranged on each tooth, according to an embodiment.

FIG. 16 is a reference diagram for describing positions of control points arranged on each tooth, according to an embodiment.

FIG. 16 is a front view showing a state in which the 3D intraoral model shown in FIG. 13 is viewed from the front.

Referring to FIG. 16, a CPG arranged on tooth #10 is shown.

For example, the control point CP10-1 may be arranged at a position that is the intersection between the gingival volume and the occlusal direction axis of each tooth.

For example, the control point CP10-2 may be arranged at a position where the occlusal direction axis and a tip of the tooth meet.

The control point CP10-3 may be arranged at a position where the gingiva and the tooth meet. For example, the position where the gingiva and the tooth meet may represent a position where the gingival base created as shown in FIG. 7 and the tooth meet.

For example, the control point CP10-4 may be arranged at a position of the root of the tooth (tooth root) on the occlusal direction axis.

As described above, the control points may be arranged at the desired positions of each tooth because information about each individual tooth has been obtained by individualizing teeth in the tooth model by using the tooth model template as described with reference to FIG. 8.

Referring to FIG. 12, in operation 1220, the data processing apparatus 100 may determine the amount of movement of the plurality of control points according to one or more displacements indicating movement of a tooth.

The data processing apparatus 100 may select tens to hundreds of vertices for each tooth. For example, 100 vertices may be randomly sampled and selected for each tooth. Also, the data processing apparatus 100 may obtain displacements from pairs of coordinates of selected vertices before movement (at a time point of scanning) and coordinates thereof after movement (at a time point after an orthodontic treatment).

The data processing apparatus 100 may determine the amount of movement of the plurality of control points by using the obtained displacements, e.g., 100 displacements when 100 vertices are selected.

In operation 1230, the data processing apparatus 100 may obtain a final gingival model by reflecting the amount of movement of the gingiva, which is determined according to the amount of movement of the plurality of control points.

According to an embodiment, the data processing apparatus 100 may calculate, by using a mesh deformation technique, the amount of movement of the control points, which approximates the space deformed to well reflect the given displacements.

For example, the data processing apparatus 100 may computing a coefficient vector $c_j$ by constructing a linear system of equations made up of control points $x_j$ and displacements $\bar{h}_i$ on main data points ($\bar{x}_i$ obtained from tooth movement and according to the radial basis function (RBF) approximation, thereby calculating a deformed shape of the gingiva.

$$\begin{bmatrix} g(r_{11}) & g(r_{12}) & \cdots & g(r_{1m}) \\ g(r_{21}) & g(r_{22}) & \cdots & g(r_{2m}) \\ \vdots & \vdots & \ddots & \vdots \\ g(r_{n1}) & g(r_{n2}) & \cdots & g(r_{nm}) \end{bmatrix} \begin{bmatrix} c_1^x & c_1^y & c_1^z \\ c_2^x & c_2^y & c_2^z \\ \vdots & \vdots & \vdots \\ c_m^x & c_m^y & c_m^z \end{bmatrix} = \begin{bmatrix} \bar{h}_1^x & \bar{h}_1^y & \bar{h}_1^z \\ \bar{h}_2^x & \bar{h}_2^y & \bar{h}_2^z \\ \vdots & \vdots & \vdots \\ \bar{h}_n^x & \bar{h}_n^y & \bar{h}_n^z \end{bmatrix}.$$

$g(r_{ij}) = \sqrt{|\bar{x}_i - x_j|^2 + \delta_j}$, radial basis function $g$ (*multiquadric*)

Figure 17:
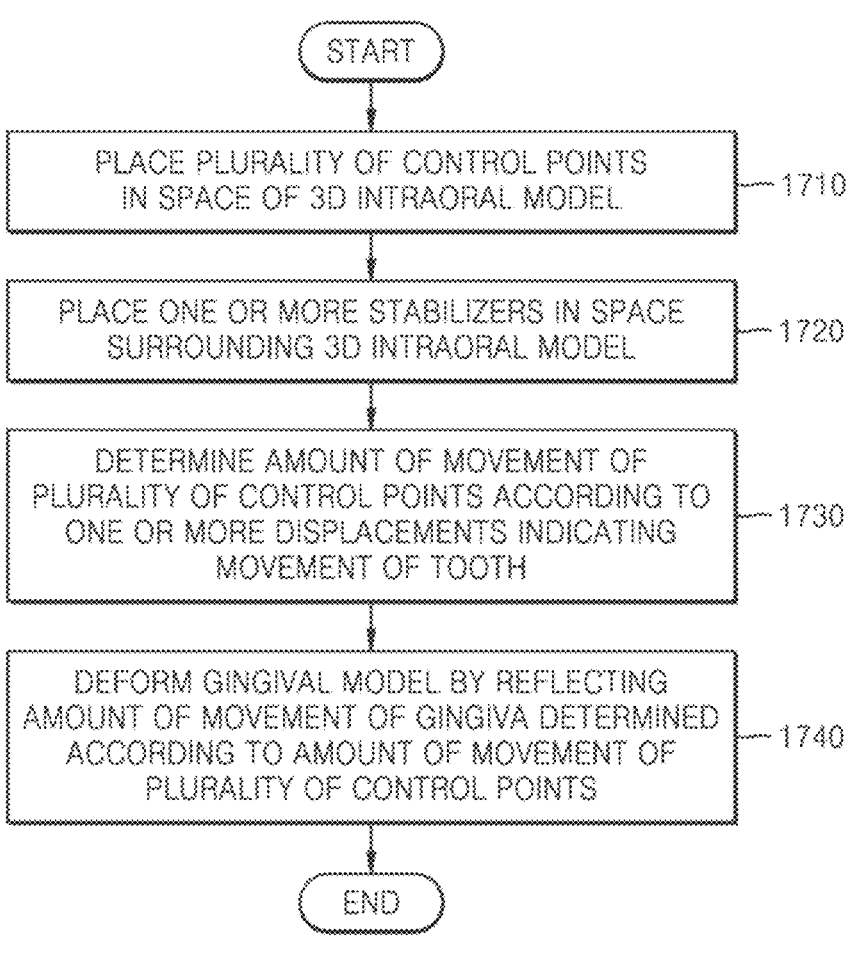
FIG. 17 is a flowchart of a method of obtaining a final gingival model by using a stabilizer as a control factor, according to an embodiment.

$\bar{x}_i = \begin{bmatrix} \bar{x}_i & \bar{y}_i & \bar{z}_i \end{bmatrix}^T$, data point, $i = 1, 2, \dots, n$ $\bar{h}_i = \begin{bmatrix} \bar{h}_i^x & \bar{h}_i^y & \bar{h}_i^z \end{bmatrix}^T$, displacement at data point $i$, $i = 1, 2, \dots, n$ $x_j = \begin{bmatrix} x_j & y_j & z_j \end{bmatrix}^T$, control point, $j = 1, 2, \dots, m$ $c_j = \begin{bmatrix} c_j^x & c_j^y & c_j^z \end{bmatrix}^T$, unknown coefficient vectors, $j = 1, 2, \dots, m$ $r_{ij} = |\bar{x}_i \cdots x_j|$, distance between $\bar{x}_i$ and $x_j$ $\delta_j$: constant assigned for each control point FIG. 17 is a flowchart of a method of obtaining a final gingival model by using a stabilizer as a control factor, according to an embodiment.

Referring to FIG. 17, in operation 1710, the data processing apparatus 100 may place a plurality of control points in a space of a 3D intraoral model.

In operation 1720, the data processing apparatus 100 may place one or more stabilizers in a space surrounding the 3D intraoral model. In detail, the data processing apparatus 100 may place separate and additional stabilizers at positions that enclose a scan model, i. e., at a position sufficient to enclose a space of interest for deformation. A stabilizer may be referred to as a zero displacement constraint. In the extreme case of the RBF interpolation described above, a space far from a place where the displacement is specified may be considered as an extrapolation region rather than an interpolation region, and the space is inherently very unstable, and deformations therein may be amplified or twisted. To suppress this phenomenon, it is necessary to impose a separate (zero) displacement constraint on positions sufficient to enclose the space of interest for deformation, and for convenience, this is referred to as a stabilizer.

That is, while tens to hundreds of vertices are selected for each tooth in order to sample displacement of the tooth, and displacements of the selected vertices are used for gingival deformation, placing a stabilizer means that separate vertices are selected separately from the displacement group sampled for each tooth, and displacement of these vertices is artificially determined as 0 and used as an input for gingival deformation.

The placement positions or number of stabilizers may be variously determined to achieve a desired behavior.

In operation 1730, the data processing apparatus 100 may determine the amount of movement of the plurality of control points according to one or more displacements indicating movement of the tooth.

In operation 1740, the data processing apparatus 100 may deform a gingival model by reflecting the amount of movement of the gingiva, which is determined according to the amount of the movement of the plurality of control points.

Figure 18:
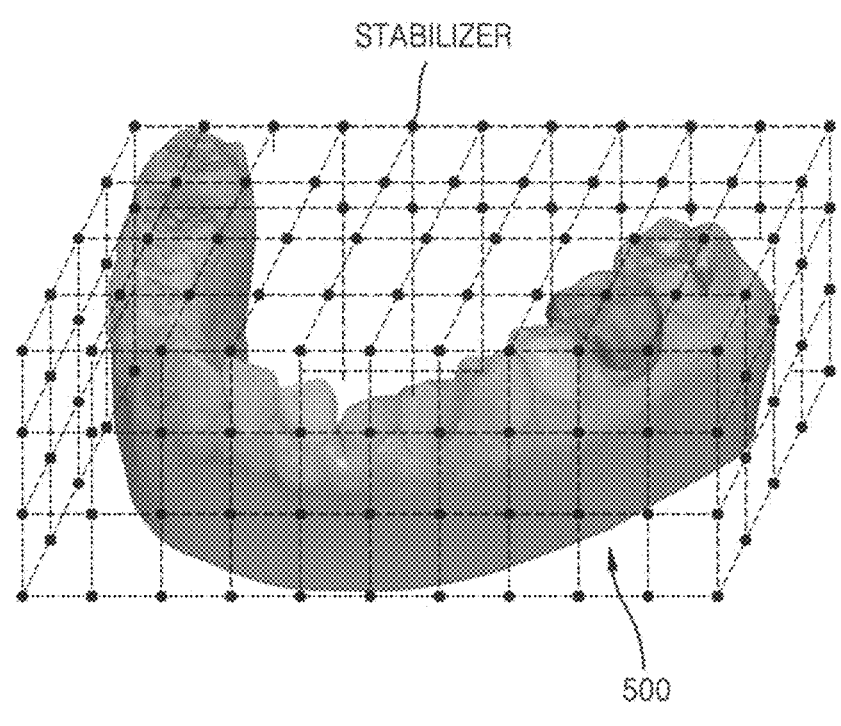
FIG. 18 is a diagram showing a state in which stabilizers are placed in a 3D intraoral model, according to an embodiment.

FIG. 18 is a diagram showing a state in which stabilizers are placed in a 3D intraoral model, according to an embodiment.

Referring to FIG. 18, the data processing apparatus 100 may place one or more stabilizers in a space surrounding a 3D intraoral model 500. Because the stabilizers artificially create data with a displacement of zero to reduce spatial distortion, they may be placed in the space surrounding the outside of the 3D intraoral model 500 where displacement exists.

According to an embodiment, the data processing apparatus 100 may arrange the stabilizers at regular intervals in a grid form in the space surrounding the 3D intraoral model 500. The present disclosure is not limited thereto, and the stabilizers may not be in a grid form and may not be arranged at regular intervals.

Figure 19:
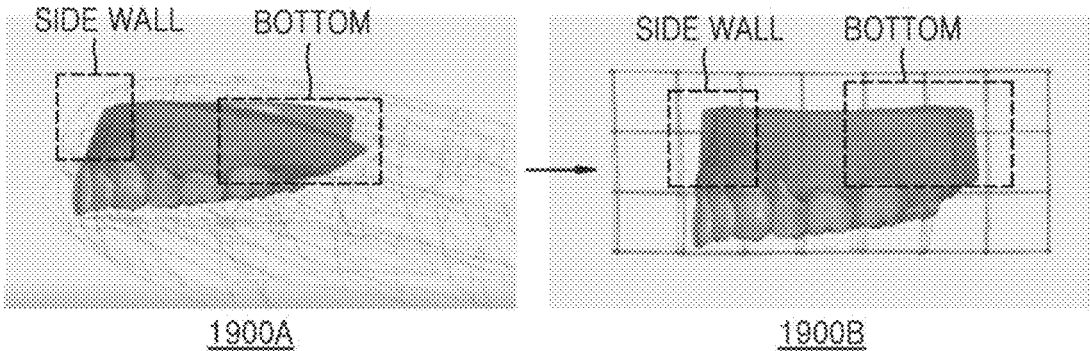
FIG. 19 is a reference diagram illustrating a difference between an example in which a stabilizer according to an embodiment of the disclosure is applied and an example in which the stabilizer is not applied.

FIG. 19 is a reference diagram illustrating a difference between an example in which a stabilizer according to an embodiment of the disclosure is applied and an example in which the stabilizer is not applied.

Referring to FIG. 19, Example 1900A shows a state of gingival deformation when a stabilizer is not applied as a control factor, and Example 1900B shows a state of the gingival deformation when the stabilizer is applied as a control factor. It can be seen that, in the Example 1900A not employing a stabilizer, a side wall and a bottom of the gingiva far away from a portion where displacement exists, i.e., a rigid tooth body, are severely distorted. However, it can be seen that, in the Example 1900B employing a stabilizer, the distortion is displayed with significant suppression at the side wall and the bottom of the gingiva.

Although the effect of fixing the gingival base may be obtained with the help of the stabilizer, the side wall of the gingiva may still be tilted or warped. This is because, due to the nature of RBF interpolation/approximation, only displacement may be assigned to knowns for defining deformation, and various constraints such as sliding, rotating, etc. may not be applied, so it is difficult to perform sliding on a specific region only with the RBF. Thus, base fixing may be used to allow only deformation in a horizontal direction and suppress deformation in a vertical direction by maintaining the height of the gingival base.

Figure 20:
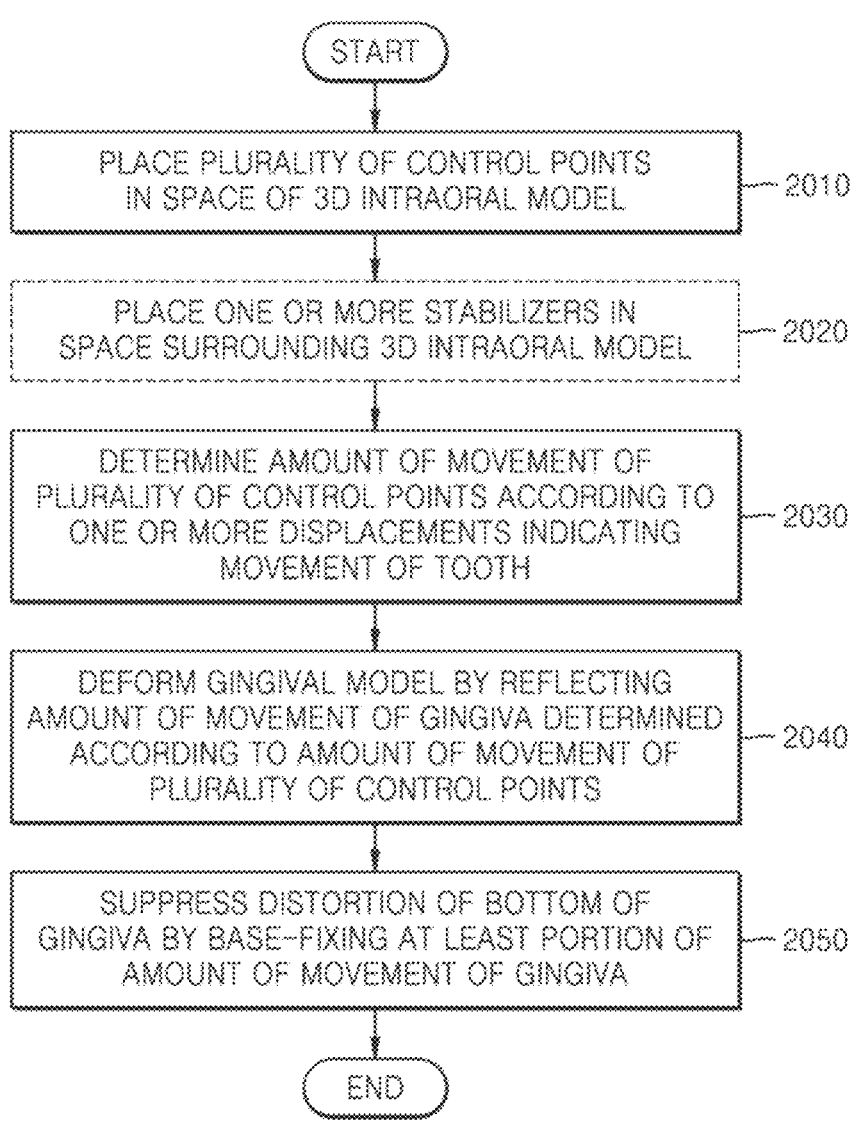
FIG. 20 is a flowchart of a method of obtaining a final gingival model by using base fixing as a control factor, according to an embodiment.

FIG. 20 is a flowchart of a method of obtaining a final gingival model by using base fixing as a control factor, according to an embodiment.

Referring to FIG. 20, in operation 2010, the data processing apparatus 100 may place a plurality of control points in a space of a 3D intraoral model.

In operation 2020, the data processing apparatus 100 may place one or more stabilizers in a space surrounding the 3D intraoral model.

In operation 2030, the data processing apparatus 100 may determine the amount of movement of the plurality of control points according to one or more displacements indicating movement of a tooth.

In operation 2040, the data processing apparatus 100 may deform a gingival model by reflecting the amount of movement of the gingiva, which is determined according to the amount of the movement of the plurality of control points.

In operation 2050, the data processing apparatus 100 may suppress distortion of a bottom of the gingiva by performing base-fixing on at least a portion of the amount of the movement of the gingiva.

In the flowchart of operations illustrated in FIG. 20, a stabilizer is used as a control factor in operation 2020, and base fixing is applied as a control factor in operation 2050. However, the present disclosure is not necessarily limited to the embodiment. Although the base fixing control factor is further used to fill gaps left by the stabilizer control factor alone, the stabilizer and the base fixing do not necessarily have to be used together as control factors, and a certain effect may be obtained by using base fixing alone without a stabilizer.

FIG. 21 is a reference diagram for describing base fixing according to an embodiment.

Referring to FIG. 21, a gingival model 2100 to which a deformation corresponding to displacement of teeth is applied may be composed of a plurality of vertices to represent a gingival region.

According to an embodiment, when moving vertices constituting the gingival region by reflecting displacement of teeth in order to keep the height of the gingival base constant in any part of the gingival region, the data processing apparatus 100 may control the displacement so that there is no movement along an axis corresponding to the height of the gingiva, e.g., a Y-axis, and allow the displacement on an X-axis to be reflected. The Y-axis may be an axis in the occlusal direction of a tooth, and the X-axis may be a direction axis perpendicular to the Y-axis. For example, if a displacement of a certain vertex in the gingival region is (x-displacement, y-displacement)=(3,3), base fixing means making the displacement of the vertex equal to (x-displacement, y-displacement)=(3,0) so that the y-displacement does not appear in the displacement of this vertex.

According to an embodiment, the data processing apparatus 100 may decrease the degree of reflection of y-displacement toward the bottom of the gingiva and increase the degree of reflection of y-displacement toward the top of the gingiva, i.e., toward the teeth. For example, the data processing apparatus 100 may reflect the y-displacement as it is at the top of the gingiva and reduce the degree of reflection of the y-displacement at the bottom of the gingiva. By doing so, at the top of the gingiva, the vertices in the gingival region move in the y-axis direction, but at the bottom of the gingiva, the vertices in the gingival region move only in the x-axis direction and do not move in the y-axis direction, which may prevent a bottom edge of the gingiva from becoming jagged.

According to an embodiment, for natural movement of vertices in the gingival region when applying such base fixation, the data processing apparatus 100 may apply an appropriate interpolation function, e.g., a straight line, a trigonometric function, or a spline curve such as a Bezier curve, etc., to determine different degrees of reflection of y-displacement for the vertices included in the gingival region depending on the y-coordinates of the vertices.

FIG. 22 is a reference diagram illustrating a difference between an example in which base fixing according to an embodiment of the disclosure is applied and an example in which base fixing is not applied.

Referring to FIG. 22, Example 2200A shows a state of gingival deformation when base fixing is not applied as a control factor, and Example 2200B shows a state of the gingival deformation when the base fixing is applied as a control factor. It can be seen that, in the Example 2200A not using base fixing, a bottom of the gingiva is unevenly distorted. However, it can be seen that, in the Example 2200B using base fixing, the uneven bottom of the gingiva is displayed with significant suppression.

Moreover, in the process of correcting severely rotated teeth, the gingiva is excessively recessed and virtual tooth roots are often exposed. As described with reference to FIG. 9, a virtual tooth root is generated by creating it on a tooth, i.e., a crown of the tooth. When two adjacent teeth rotate during orthodontic treatment, the rotating teeth usually produce displacements that conflict with each other, resulting in an unstable deformation around the teeth, and this unstable behavior may be improved by reducing only a rotation transformation component having the occlusal direction as an axis among rigid body transformation components of a tooth. This control factor may be referred to as an angular displacement reducer.

The angular displacement reducer refers to removing or reducing a rotation transformation component in a displacement calculated based on coordinate pairs sampled from a tooth model. The angular displacement reducer reduces only an angle of rotation having the occlusal direction as an axis among rigid body transformation components of a tooth in a scan model. Because the gingiva does not rotate as much as teeth even when the teeth rotate a lot, recession of the gingiva may be prevented by reducing the amount of rotation of the gingiva around the occlusal direction as an axis (e.g., by reducing it to 50% or less).

According to an embodiment, an angular displacement reducer may control not only the amount of rotation of the gingiva about an occlusal direction axis but also the amount of rotation of the gingiva about a distal-mesial direction axis or a buccal-lingual direction axis.

Figure 23:
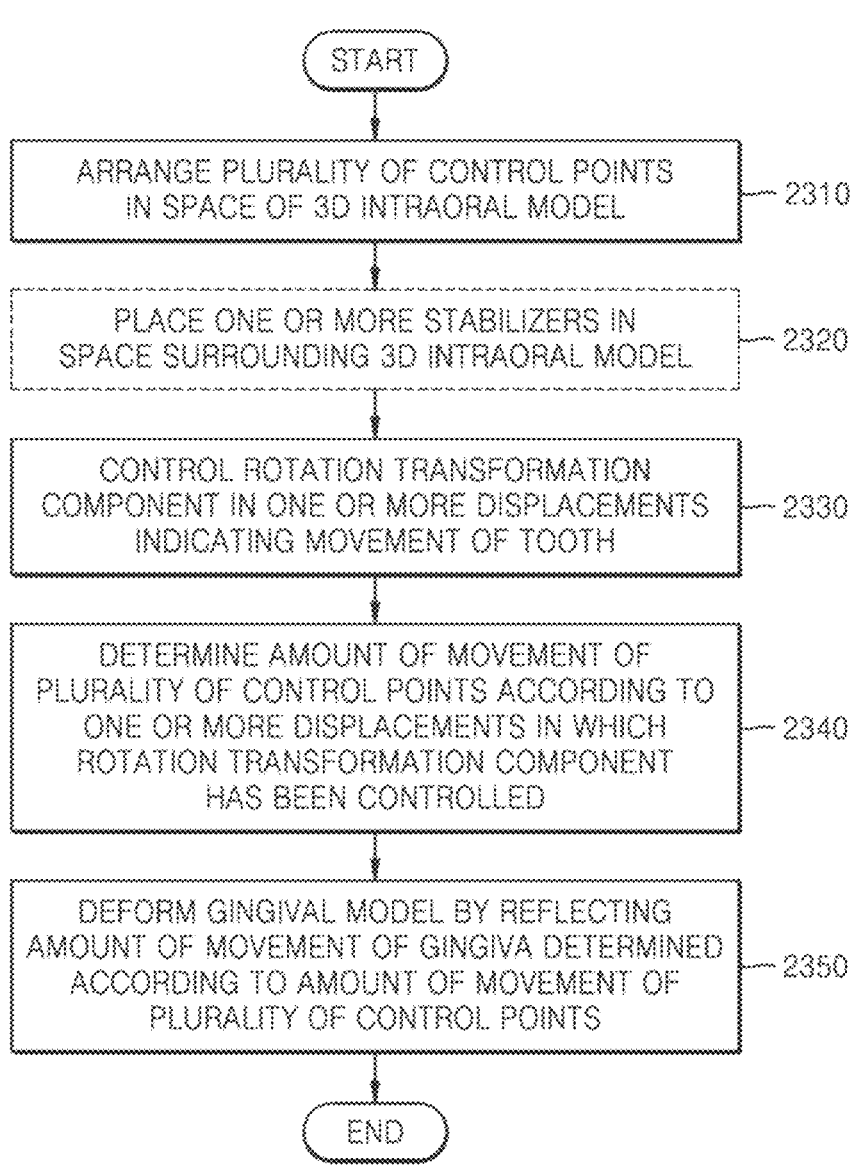
FIG. 23 is a flowchart of a method of obtaining a final gingival model by using an angular displacement reducer as a control factor, according to an embodiment.

FIG. 23 is a flowchart of a method of obtaining a final gingival model by using an angular displacement reducer as a control factor, according to an embodiment.

Referring to FIG. 23, in operation 2310, the data processing apparatus 100 may place a plurality of control points in a space of a 3D intraoral model.

In operation 2320, the data processing apparatus 100 may place one or more stabilizers in a space surrounding the 3D intraoral model.

In operation 2330, the data processing apparatus 100 may control a rotation transformation component in one or more displacements indicating movement of a tooth.

According to an embodiment, the data processing apparatus 100 may variously determine how much to control a rotation transformation component when controlling the rotation transformation component in the displacement indicating the movement of the tooth. For example, the reduced amount of rotation may be appropriately controlled, such as 20% reduction, 50% reduction, 70% reduction, etc. of the rotation transformation component.

A method of controlling a rotation transformation component in a displacement indicating movement of a tooth is described with reference to FIG. 24.

Figure 24:
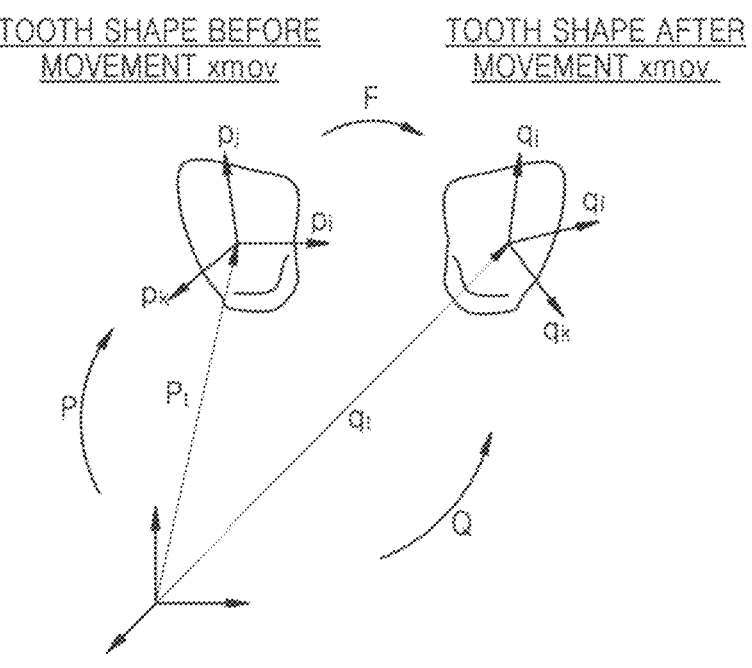
FIG. 24 is a reference diagram for describing a method, performed by a data processing apparatus, of controlling a rotation transformation component in a displacement indicating movement of a tooth, according to an embodiment.

FIG. 24 is a reference diagram for describing a method, performed by the data processing apparatus 100, of controlling a rotation transformation component in a displacement indicating movement of a tooth, according to an embodiment.

Referring to FIG. 24, a tooth model represented by a coordinate x on a local coordinate system of a tooth may represent a tooth shape $x_{ref}$ before movement and a tooth shape $x_{mov}$ after movement respectively with the following 4×4 homogeneous matrices P and Q.

$$x_{ref} = Px, \quad x_{mov} = Qx \quad x = [\begin{matrix} x & y & z \end{matrix}]^T$$

$$P = \begin{bmatrix} p_i & p_j & p_k & p_t \\ 0 & 0 & 0 & 1 \end{bmatrix}, \text{ tooth coordinate system 1 (reference)}$$

$$Q = \begin{bmatrix} q_i & q_j & q_k & q_l \\ 0 & 0 & 0 & 1 \end{bmatrix}, \text{ tooth coordinate system 2 (moving)}$$

When an increment P→Q between the two homogeneous transformation matrices is denoted by F, a relationship between the tooth shape before movement and the tooth shape after movement may be expressed by the following equation.

$$F = P^{-1}Q = \begin{bmatrix} f_i & f_j & f_k & f_t \\ 0 & 0 & 0 & 1 \end{bmatrix}$$

$$x_{mov} = QP^{-1}x_{ref} = PFP^{-1}x_{ref} = PFx$$

When the incremental homogeneous matrix F is to be simplified to only rotation on a plane parallel to Y-direction base vectors pj and qj of P and Q, F' that is obtained by replacing an upper-left 3×3 matrix component of F responsible for rotation transformation with a combination of G and Rz(θ) that is a 3×3 transformation matrix that rotates about a z-axis on the local coordinate system by θ in radians (or by αθ in radians with a reduction factor α applied) may be used instead of F to obtain $x'_{mov}$ with an appropriately reduced amount of rotation.

$$\theta = a\cos(p_j \cdot q_j)$$

$$G = \begin{bmatrix} g_i & j & g_k \end{bmatrix}, j = \begin{bmatrix} 0 & 1 & 0 \end{bmatrix}^T, g_k = \frac{j \times f_j}{|j \times f_j|}, g_i = j \times g_k$$

$$R_z(\theta) = \begin{bmatrix} \cos\theta & \sin-\theta & 0 \\ \sin\theta & \cos\theta & 0 \\ 0 & 0 & 1 \end{bmatrix}$$

$$F'(\alpha) = \begin{bmatrix} GR(\alpha\theta)G^{-1} & f_t \\ 0 & 1 \end{bmatrix}$$

$$x'_{mov} = PF'(\alpha)P^{-1}x_{ref}$$

Referring back to FIG. 23, in operation 2340, the data processing apparatus 100 may determine the amount of the movement of plurality of control points according to the one or more displacements in which the rotation transformation component has been controlled.

In operation 2350, the data processing apparatus 100 may deform a gingival model by reflecting the amount of movement of the gingiva, which is determined according to the amount of the movement of the plurality of control points.

An operation of applying base fixing as a control factor like in operation 2050 is not included in the flowchart of operations illustrated in FIG. 23. However, the present disclosure is not necessarily limited to the embodiment. The operation of using base fixing as a control factor may be further added to the example of operations shown in FIG. 23.

While the examples described above with reference to FIGS. 2 to 24 have been described mainly with respect to the mandible (lower jaw), the embodiments disclosed herein may be equally applied to the maxilla (upper jaw).

Therefore, according to an embodiment, the data processing apparatus 100 may naturally model the deformation of an upper gingiva according to movement of teeth in the upper jaw and the deformation of a lower gingiva according to movement of teeth in the lower jaw by using the method described above for both the upper jaw and the lower jaw.

Various embodiments for naturally showing deformation of the gingiva according to movement of the teeth have been described above. Not only the deformation of the gingiva according to the movement of the patient's teeth, but also deformation of the overall facial contour may be shown. Therefore, the gingival deformation method as described above may also be applied to a facial deformation method.

Figure 25:
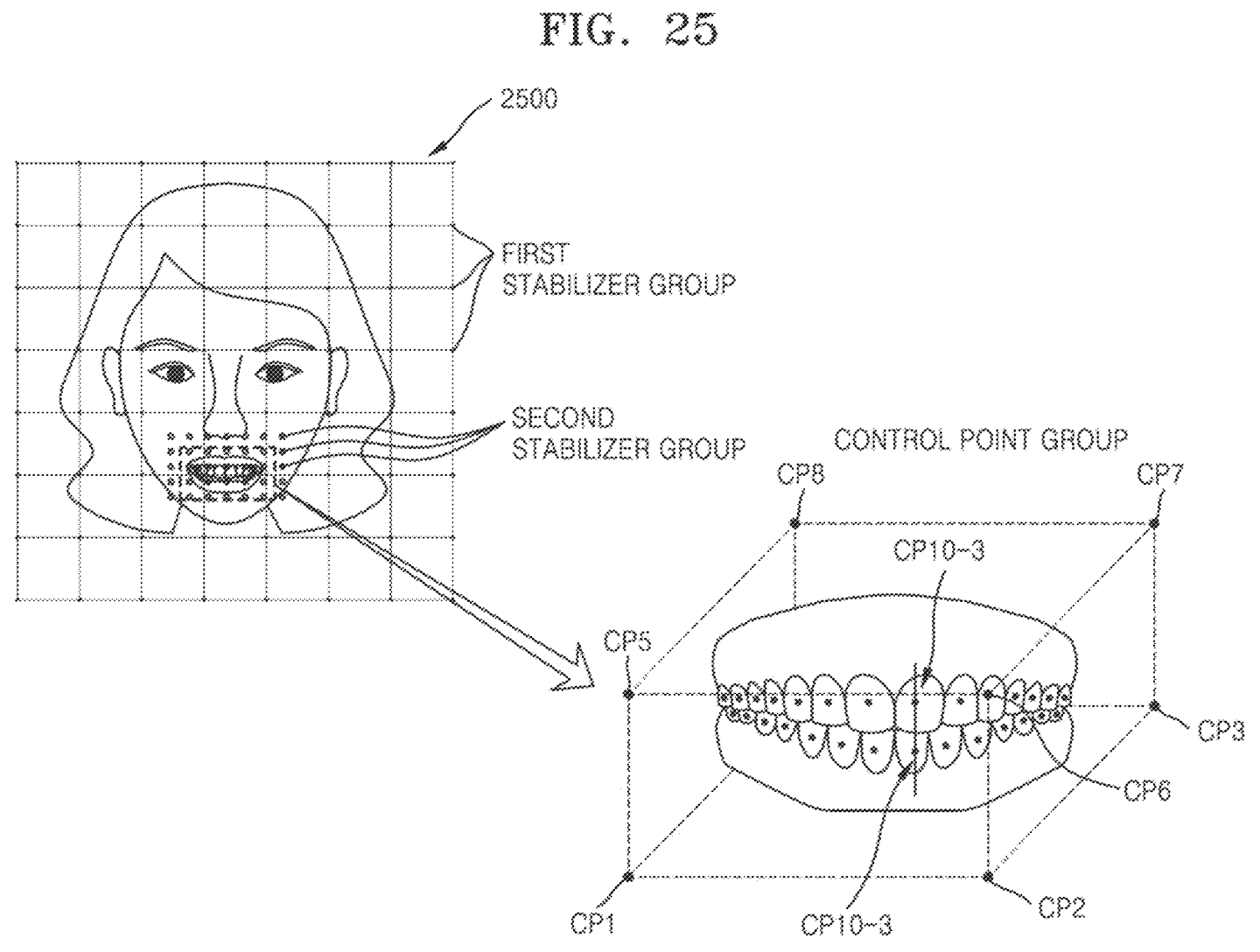

FIG. 25 is a reference diagram for describing a method for naturally showing facial deformation according to movement of teeth, according to an embodiment.

Referring to FIG. 25, the data processing apparatus 100 may apply one or more control factors to suppress excessive deformation when facial deformation is performed according to movement of teeth.

The data processing apparatus 100 may receive face raw data obtained by scanning a face with visible teeth from the scanning device 50 and process the face raw data to generate a face model 2500.

According to an embodiment, the data processing apparatus 100 may place one or more control points on a 3D intraoral model including a tooth model and a gingival model in order to deform a region in close proximity to the mouth of the face according to the movement of the teeth.

According to an embodiment, the data processing apparatus 100 may place a total of eight control points CP1 to CP8 by arranging a control point at each vertex of a 3D figure surrounding the 3D intraoral model including the tooth model and the gingival model. In this case, the tooth model may represent a tooth model including the lower jaw and the upper jaw.

According to an embodiment, the data processing apparatus 100 may place one control point for each tooth. The data processing apparatus 100 may place one control point for each tooth in the upper jaw and one control point for each tooth in the lower jaw. Because the placement of one control point for each tooth is merely exemplary, more than one control point may be arranged, and in some cases, control points may be arranged on some teeth rather than all teeth. A position of a control point arranged on each tooth may be determined in various ways, and, for example, as described with reference to FIG. 15, a control point may be arranged at CP10-3 that is a position where the gingiva and each tooth meet.

According to an embodiment, the data processing apparatus 100 may place a first stabilizer group on a 3D space surrounding a face scan model so as to suppress deformation of the entire face. As described above with reference to FIG. 18, the data processing apparatus 100 may arrange a plurality of first stabilizers in a grid form in the space surrounding the face scan model.

According to an embodiment, the data processing apparatus 100 may place a second stabilizer group at a boundary between the chin and the nose to prevent parts around the mouth, such as the nose and chin, from being deformed when the region in close proximity to the mouth is deformed by the control points. The second stabilizers included in the second stabilizer group may have a narrower interval than that of the first stabilizers included in the first stabilizer group.

According to an embodiment, as described above, the data processing apparatus 100 may display, on a display, a final 3D intraoral model in which the gingiva is deformed according to the movement of the teeth.

Figure 26:
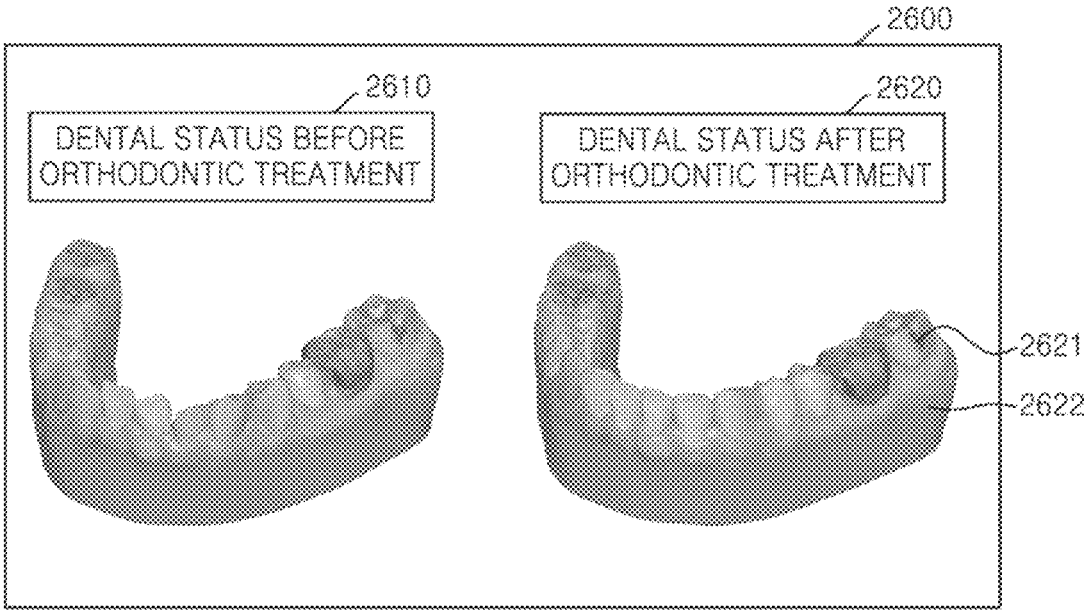
FIG. 26 illustrates an example of a graphical user interface on which a final 3D intraoral model is displayed, according to an embodiment.

FIG. 26 illustrates an example of a graphical user interface on which a final 3D intraoral model is displayed, according to an embodiment.

According to an embodiment, the data processing apparatus 100 may provide a graphical user interface capable of displaying an initial 3D intraoral model and/or a final 3D intraoral model. For example, the initial 3D intraoral model may represent a patient's dental status before orthodontic treatment, and the final 3D intraoral model may represent a patient's dental status after the orthodontic treatment. In this way, by showing the patient his or her dental status before orthodontic treatment and the dental status predicted after the orthodontic treatment, the patient is able to expect how much his or her dental status may be changed by the orthodontic treatment.

According to an embodiment, the data processing apparatus 100 may provide a menu for displaying a patient's dental status before orthodontic treatment and a patient's dental status after the orthodontic treatment, and in response to a user input for selecting such a menu, the data processing apparatus 100 may display a graphical user interface showing a dental status before orthodontic treatment and a dental status expected after the orthodontic treatment, as shown in FIG. 26.

Referring to FIG. 26, in a graphical user interface 2600, a dental status 2610 before orthodontic treatment may represent a 3D virtual model obtained by scanning a patient's teeth before the orthodontic treatment.

In the graphical user interface 2600, a dental status 2620 after the orthodontic treatment may include a tooth model 2621 expected after the patient undergoes orthodontic treatment and a gingival model 2622 in which the gingiva is deformed according to movement of teeth due to the orthodontic treatment. In this case, because when tooth movement information is reflected in the gingival deformation as it is, the deformed gingiva may appear excessively distorted, the naturally deformed gingival model 2622 may be displayed by suppressing excessive deformation of the gingiva using one or more control factors as disclosed herein, so that the dental status after orthodontic treatment may be shown to the patient in a more comfortable manner.

A patient undergoing orthodontic treatment not only wants to know how his or her teeth will be changed by the orthodontic treatment, but may also want to know how his/her face will look after the orthodontic treatment. To this end, according to an embodiment, as described above, the data processing apparatus 100 may display, on the display, a final 3D face model in which a face is deformed according to movement of the teeth.

Figure 27:
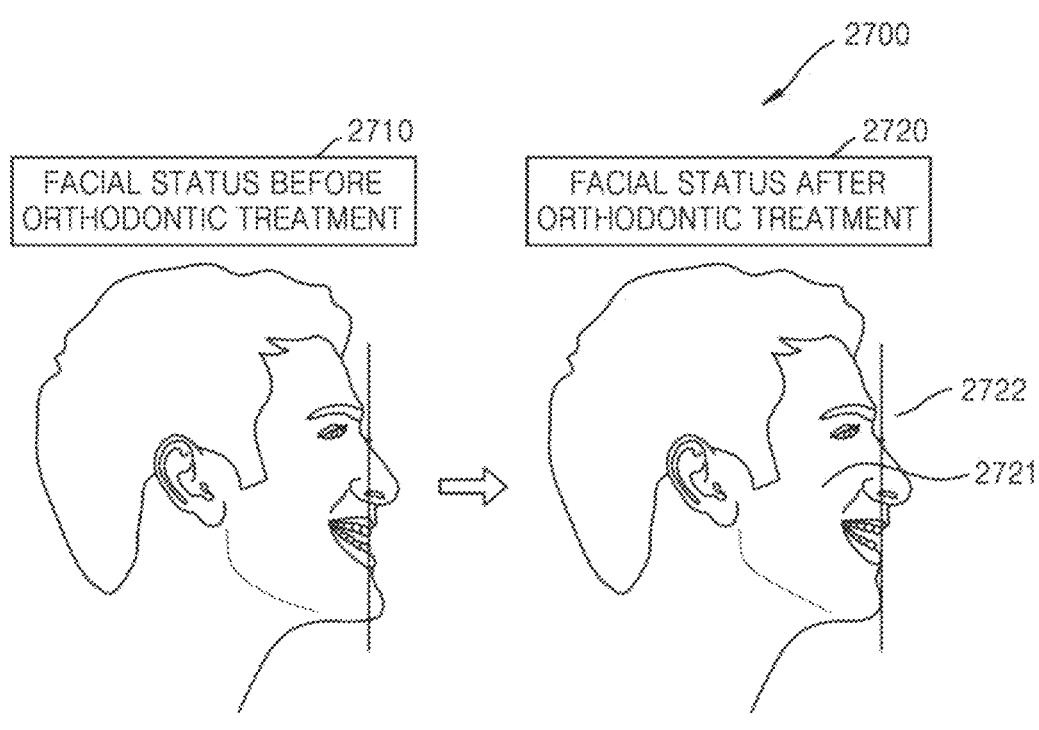
FIG. 27 illustrates an example of a graphical user interface displaying a final 3D face model, according to an embodiment.

FIG. 27 illustrates an example of a graphical user interface displaying a final 3D face model, according to an embodiment.

According to an embodiment, the data processing apparatus 100 may provide a graphical user interface capable of displaying an initial 3D face model and/or a final 3D face model. For example, the initial 3D face model may represent a status of a patient's face before orthodontic treatment, and the final 3D intraoral model may represent a status of the patient's face after the orthodontic treatment. In this way, by showing the patient the status of his or her face before orthodontic treatment and the status of face predicted after the orthodontic treatment, the patient is able to expect how much his or her face may be changed by the orthodontic treatment. In particular, for a patient undergoing orthodontic treatment due to protruding teeth, it may be important to provide a status of his or her face predicted after the orthodontic treatment because facial contours around the mouth may be significantly changed due to correction of the protruding teeth.

According to an embodiment, the data processing apparatus 100 may provide a menu for displaying a status of a patient's face before orthodontic treatment and a status of the patient's face after the orthodontic treatment, and in response to a user input for selecting such a menu, the data processing apparatus 100 may display a graphical user interface showing a facial status before orthodontic treatment and a facial status expected after the orthodontic treatment, as shown in FIG. 27.

Referring to FIG. 27, in a graphical user interface 2700, a facial status 2710 before orthodontic treatment may represent a 3D virtual model obtained by scanning a patient's face before the orthodontic treatment.

In the graphical user interface 2700, a facial status 2720 after the orthodontic treatment may include a tooth model 2721 expected after the patient undergoes orthodontic treatment and a face model 2722 in which the face is deformed according to movement of teeth due to the orthodontic treatment. In this case, because when tooth movement information is reflected in the facial deformation as it is, the deformed face may appear excessively distorted, the naturally deformed face model 2722 may be displayed by suppressing excessive deformation of the face using one or more control factors as disclosed herein, so that a more conformable and reliable facial status after orthodontic treatment may be shown to the patient.

A method of processing an intraoral model according to an embodiment of the present disclosure may be implemented in the form of program commands executable by various types of computers and recorded on computer-readable recording media. Furthermore, according to an embodiment of the present disclosure, computer-readable storage media having recorded thereon one or more programs including at least one instruction for executing the method of processing an intraoral model may be provided.

The computer-readable storage media may include program commands, data files, data structures, etc. either alone or in combination. Examples of the computer-readable storage media include magnetic media such as hard disks, floppy disks, and magnetic tapes, optical media such as compact disk ROM (CD-ROM) and digital versatile disks (DVDs), magneto-optical media such as floptical disks, and hardware devices that are specially configured to store and perform program commands, such as ROM, RAM, flash memory, etc.

Here, the computer-readable storage media may be provided in the form of non-transitory storage media. In this regard, the term 'non-transitory storage media' may mean that the storage media are a tangible device. Furthermore, the 'non-transitory storage media' may include a buffer for temporarily storing data.

According to an embodiment, methods of processing an intraoral model, according to various embodiments of the present disclosure, may be included in a computer program product when provided. The computer program product may be distributed in the form of a computer-readable storage medium (e.g., CD-ROM). Alternatively, the computer program product may be distributed (e.g., downloaded or uploaded) on-line via an application store (e.g., Google™ Play Store™, etc.) or directly between two user devices (e.g., smartphones). Specifically, the computer program product according to the disclosed embodiment may include a storage medium having recorded thereon a program including at least one instruction for performing the method of processing an intraoral model according to the disclosed embodiment.

While embodiments have been particularly described above, the embodiments are not to be construed as limiting the scope of the present disclosure, and various modifications and improvements made by those of ordinary skill in the art based on a basic concept of the present disclosure also fall within the scope of the present disclosure as defined by the following claims.

The invention claimed is:

1. An apparatus for processing a three-dimensional (3D) intraoral model, the apparatus comprising:

a memory storing one or more instructions; and
a processor configured to execute the one or more instructions stored in the memory to obtain a tooth model and a gingival model from the 3D intraoral model,
deform the gingival model by reflecting an amount of movement of gingiva according to a displacement indicating movement of one or more teeth included in the tooth model,
obtain a final gingival model by suppressing, using one or more control factors, at least a part of the displacement indicating movement of the teeth from being reflected in the amount of movement of the gingiva, and
display, on a display, the obtained final gingival model and a final tooth model representing movement of the one or more teeth included in the tooth model,
wherein to obtain the final gingival model, the processor is configured to execute the one or more instructions stored in the memory by at least one of:
reducing a rotation transformation component having an occlusal direction as an axis in the displacement indicating movement of the teeth,
suppressing distortion in a space surrounding the 3D intraoral model by placing one or more stabilizers in the space surrounding the 3D intraoral model, or
suppressing distortion of a bottom of the gingiva by performing base-fixing on at least a portion of the amount of movement of the gingiva.

2. The apparatus of claim 1, wherein an amount of a horizontal translation of the gingiva included in the final gingival model is less than or equal to a value of a displacement indicating a horizontal translation of the one or more teeth.

3. The apparatus of claim 1, wherein an amount of rotation of the gingiva included in the final gingival model is less than or equal to a value of a displacement indicating rotation of the one or more teeth.

4. The apparatus of claim 1, wherein
the processor is further configured to execute the one or more instructions to
place a plurality of control points in a space of the 3D intraoral model,
determine an amount of movement of the plurality of control points according to the displacement indicating movement of the one or more teeth, and
deform the gingival model by reflecting the amount of movement of the gingiva, which is determined according to the amount of movement of the plurality of control points.

5. The apparatus of claim 4, wherein the processor is further configured to execute the one or more instructions to place the plurality of control points at different densities according to the displacement indicating movement of the teeth.

6. A non-transitory computer-readable recording medium having recorded thereon a program including at least one instruction for performing a method of processing a three-dimensional (3D) intraoral model by a computer, the method comprising:
obtaining a tooth model and a gingival model from the 3D intraoral model;
deforming the gingival model by reflecting an amount of movement of gingiva according to a displacement indicating movement of one or more teeth included in the tooth model;
obtaining a final gingival model by suppressing, using one or more control factors, at least a part of the displacement indicating movement of the teeth from being reflected in the amount of movement of the gingiva; and displaying, on a display, the obtained final gingival model together with a final tooth model representing movement of the one or more teeth included in the tooth model, wherein the obtaining of the final gingival model using the control factors comprises at least one of:

reducing a rotation transformation component having an occlusal direction as an axis in the displacement indicating movement of the teeth, suppressing distortion in a space surrounding the 3D intraoral model by placing one or more stabilizers in the space surrounding the 3D intraoral model, or suppressing distortion of a bottom of the gingiva by performing base-fixing on at least a portion of the amount of movement of the gingiva.

7. A method of processing a three-dimensional (3D) intraoral model in a data processing apparatus, the method comprising:

obtaining a tooth model and a gingival model from the 3D intraoral model;

deforming the gingival model by reflecting an amount of movement of gingiva according to a displacement indicating movement of one or more teeth included in the tooth model;

obtaining a final gingival model by suppressing, using one or more control factors, at least a part of the displacement indicating movement of the teeth from being reflected in the amount of movement of the gingiva; and displaying, on a display, the obtained final gingival model and a final tooth model representing movement of the one or more teeth included in the tooth model, wherein the obtaining of the final gingival model using the control factors comprises at least one of:

reducing a rotation transformation component having an occlusal direction as an axis in the displacement indicating movement of the teeth, suppressing distortion in a space surrounding the 3D intraoral model by placing one or more stabilizers in the space surrounding the 3D intraoral model, or suppressing distortion of a bottom of the gingiva by performing base-fixing on at least a portion of the amount of movement of the gingiva.

8. The method of claim 7, wherein an amount of a horizontal translation of the gingiva included in the final gingival model is less than or equal to a value of a displacement indicating a horizontal translation of the one or more teeth.

9. The method of claim 7, wherein an amount of rotation of the gingiva included in the final gingival model is less than or equal to a value of a displacement indicating rotation of the one or more teeth.

10. The method of claim 7, wherein the deforming of the gingival model comprises:

placing a plurality of control points in a space of the 3D intraoral model;

determining an amount of movement of the plurality of control points, according to the displacement indicating movement of the one or more teeth; and deforming the gingival model by reflecting the amount of movement of the gingiva, which is determined according to the amount of movement of the plurality of control points.

11. The method of claim 10, wherein the placing of the plurality of control points in the space of the 3D intraoral model comprises placing the plurality of control points at different densities according to the displacement indicating movement of the teeth.

12. The method of claim 11, wherein the placing of the plurality of control points in the space of the 3D intraoral model comprises placing one or more control points on at least a part of faces of a three-dimensional shape surrounding the 3D intraoral model.

13. The method of claim 10, wherein the placing of the plurality of control points in the space of the 3D intraoral model comprises serially placing one or more control points on an axis of rotation of the teeth.

14. The method of claim 1, wherein the stabilizers represent a zero displacement constraint.

15. The method of claim 1, wherein the base-fixing is performed by controlling displacement of the bottom of the gingiva in the occlusal direction.

16. The method of claim 1, wherein the obtaining of the tooth model and the gingival model from the 3D intraoral model comprises:

identifying a gingival region in the 3D intraoral model; and obtaining the gingival model by creating a virtual gingival base at an edge of the identified gingival region.

17. The method of claim 1, wherein an approximation technique is used to obtain the final gingival model.

* * * * *